(12) United States Patent
Tsai et al.

(10) Patent No.: US 9,136,559 B2
(45) Date of Patent: Sep. 15, 2015

(54) NON-AQUEOUS ELECTROLYTE AND LITHIUM SECONDARY BATTERY INCLUDING THE SAME

(75) Inventors: Li-Duan Tsai, Hsinchu (TW);
Yueh-Wei Lin, Hsinchu (TW);
Chia-Chen Fang, Taipei (TW);
Cheng-Liang Cheng, Hsinchu (TW);
Jing-Pin Pan, Hsinchu County (TW);
Tsung-Hsiung Wang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 250 days.

(21) Appl. No.: 13/339,384

(22) Filed: Dec. 29, 2011

(65) Prior Publication Data

US 2012/0171579 A1 Jul. 5, 2012

Related U.S. Application Data

(63) Continuation-in-part of application No. 13/110,924, filed on May 19, 2011.

(30) Foreign Application Priority Data

Dec. 29, 2010 (TW) .............................. 99146602 A
Dec. 23, 2011 (TW) ............................. 100148311 A

(51) Int. Cl.
*H01M 10/0567* (2010.01)
*H01M 10/0525* (2010.01)
*H01M 4/58* (2010.01)
*H01M 10/42* (2006.01)
*H01M 4/40* (2006.01)
*H01M 4/587* (2010.01)
*H01M 4/62* (2006.01)
*H01M 10/0568* (2010.01)
*H01M 10/0569* (2010.01)

(52) U.S. Cl.
CPC .......... *H01M 10/0525* (2013.01); *H01M 4/581* (2013.01); *H01M 4/5815* (2013.01); *H01M 10/0567* (2013.01); *H01M 4/405* (2013.01); *H01M 4/587* (2013.01); *H01M 4/621* (2013.01); *H01M 4/625* (2013.01); *H01M 4/626* (2013.01); *H01M 10/0568* (2013.01); *H01M 10/0569* (2013.01); *H01M 10/4235* (2013.01); *H01M 2300/0025* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,033,797 A | 3/2000 | Mao et al. | |
| 6,045,952 A | 4/2000 | Kerr et al. | |
| 6,074,776 A | 6/2000 | Mao et al. | |
| 6,074,777 A | 6/2000 | Reimers et al. | |
| 6,146,790 A | 11/2000 | Omaru et al. | |
| 6,235,432 B1 * | 5/2001 | Kono et al. | 429/303 |
| 6,387,571 B1 | 5/2002 | Lain et al. | |
| 6,413,679 B1 | 7/2002 | Kuboki et al. | |
| 7,217,479 B2 | 5/2007 | Park et al. | |
| 7,300,852 B2 | 11/2007 | Cho et al. | |
| 7,736,812 B2 | 6/2010 | Han et al. | |
| 7,745,054 B2 | 6/2010 | Kim et al. | |
| 2002/0001756 A1 | 1/2002 | Hamamoto et al. | |
| 2003/0219647 A1 * | 11/2003 | Wariishi | 429/111 |
| 2006/0194118 A1 | 8/2006 | Yew et al. | |
| 2008/0160418 A1 * | 7/2008 | Pan et al. | 429/328 |
| 2009/0253045 A1 | 10/2009 | Kotato et al. | |

FOREIGN PATENT DOCUMENTS

| | | |
|---|---|---|
| CN | 1577945 | 2/2005 |
| CN | 101210078 | 7/2008 |
| CN | 101212065 | 7/2008 |
| EP | 0775701 | 5/1997 |
| JP | 09-106835 | 4/1997 |
| JP | 09-171840 | 6/1997 |
| JP | 11-045724 | 2/1999 |
| JP | 11-317230 | 11/1999 |
| JP | 2001-332297 | 11/2001 |
| JP | 2002359002 | 12/2002 |
| JP | 2005-209469 | 8/2005 |
| JP | 2006216276 | 8/2006 |
| JP | 2007112722 | 5/2007 |
| JP | 2008-198542 | 8/2008 |
| JP | 2008226606 | 9/2008 |

(Continued)

OTHER PUBLICATIONS

"Office Action of Japan counterpart application" issued on Jun. 4, 2013, p. 1-p. 4.
"Office Action of China Counterpart Application", issued on Aug. 2, 2013, p. 1-p. 7.
"Office Action of Taiwan Counterpart Application", issued on Dec. 18, 2013, p. 1-p. 6.
Wang et al., "Polymer Chemistry Guide," Science Press, Dec., 2007, pp. 246.
"Office Action of China Counterpart Application", issued on Feb. 24, 2014, p. 1-p. 10.

*Primary Examiner* — Carlos Barcena
*Assistant Examiner* — Wojciech Haske
(74) *Attorney, Agent, or Firm* — Jianq Chyun IP Office

(57) ABSTRACT

A non-aqueous electrolyte including a lithium salt, an organic solvent, and an electrolyte additive is provided. The electrolyte additive is a meta-stable state nitrogen-containing polymer formed by reacting Compound (A) and Compound (B). Compound (A) is a monomer having a reactive terminal functional group. Compound (B) is a heterocyclic amino aromatic derivative as an initiator. A molar ratio of Compound (A) to Compound (B) is from 10:1 to 1:10. A lithium secondary battery containing the non-aqueous electrolyte is further provided. The non-aqueous electrolyte of this disclosure has a higher decomposition voltage than a conventional non-aqueous electrolyte, such that the safety of the battery during overcharge or at high temperature caused by short-circuit current is improved.

21 Claims, 25 Drawing Sheets

(56) References Cited

FOREIGN PATENT DOCUMENTS

| | | |
|---|---|---|
| JP | 2009302058 | 12/2009 |
| JP | 2010118337 | 5/2010 |
| JP | 2010529608 | 8/2010 |
| TW | 480756 | 3/2002 |
| TW | 506156 | 10/2002 |
| TW | 523946 | 3/2003 |
| TW | I232607 | 5/2005 |
| TW | 200828651 | 7/2008 |
| TW | I323522 | 4/2010 |

\* cited by examiner

Example 22

Comparative Example 1

NON-AQUEOUS ELECTROLYTE AND LITHIUM SECONDARY BATTERY INCLUDING THE SAME

CROSS-REFERENCE TO RELATED APPLICATION

This is a continuation-in-part application of and claims the priority benefit of patent application Ser. No. 13/110,924, filed on May 19, 2011, now pending, which claims the priority benefit of Taiwan application Serial No. 99146602, filed on Dec. 29, 2010. This application also claims the priority benefit of Taiwan application serial no. 100148311, filed on Dec. 23, 2011. The entirety of the above-mentioned patent applications is hereby incorporated by reference herein and made a part of this specification.

TECHNICAL FIELD

The disclosure relates to a non-aqueous electrolyte that improves the safety of the battery during overcharge or at high temperature caused by short-circuit current, and to a lithium secondary battery containing the non-aqueous electrolyte.

BACKGROUND

The current portable electronic devices are almost absolutely dependent on rechargeable lithium secondary battery as their power. This demand drives people to continuously endeavor to various researches to increase the specific capacity and the specific energy, prolong the serving life, and improve the safety.

The safety problem of the lithium secondary battery mainly comes from the raised internal temperature of the battery, including improper heating, overcharge, and short circuit due to contact of the positive electrode material and the negative electrode material. When the internal temperature of the battery is continuously raised and cannot be inhibited, the separator film for separating the positive electrode material and the negative electrode material will be melted and broken, thus resulting in large short-circuit current, and then the battery will get hot at an accelerated rate. When the temperature of the battery is raised to 180° C., decomposition of the electrolyte and the positive electrode material occurs, a large amount of heat is generate and a large amount of gas is emitted, thus causing fire, combustion, explosion, and other dangers.

It can be seen that, the safety of the lithium secondary battery is associated with the reaction temperature of the electrolyte and the positive electrode material and the decomposition voltage of the electrolyte. The higher the reaction temperature of the electrolyte and the positive electrode material is (representing that the high-temperature tolerance is higher), the higher the decomposition voltage of the electrolyte is (representing that the overcharge tolerance is higher), and the better the safety of the lithium secondary battery is. Therefore, to ensure the safe use of the consumer, a non-aqueous electrolyte capable of improving the safety of the lithium secondary battery is deeply desired.

SUMMARY

Accordingly, a non-aqueous electrolyte and a lithium secondary battery containing the non-aqueous electrolyte are introduced herein, in which a protective film is formed on a positive electrode surface upon overcharge, so as to improve the safety of the lithium secondary battery.

A non-aqueous electrolyte is introduced herein, which includes a lithium salt, an organic solvent, and an electrolyte additive. The electrolyte additive is a meta-stable state nitrogen-containing polymer formed by reacting Compound (A) and Compound (B). Compound (A) is a monomer with a reactive terminal functional group. Compound (B) is a heterocyclic amino aromatic derivative as an initiator. A molar ratio of Compound (A) to Compound (B) is from 10:1 to 1:10.

A lithium secondary battery is further introduced herein, which includes a positive electrode, a negative electrode, a separator film, and the above-mentioned non-aqueous electrolyte.

Based on the above, the non-aqueous electrolyte of the disclosure contains the meta-stable state nitrogen-containing polymer as an electrolyte additive, such that the decomposition voltage of the electrolyte is increased, and the reaction temperature of the electrolyte and the positive electrode material is raised, while the reaction heat is decreased. Thus, the safety of the battery during overcharge or at high temperature caused by short-circuit current is improved, and the safe use of the consumer is accordingly ensured.

In order to make the features and advantages of the present invention clearer and more understandable, the following embodiments are illustrated in detail with reference to the appended drawings.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
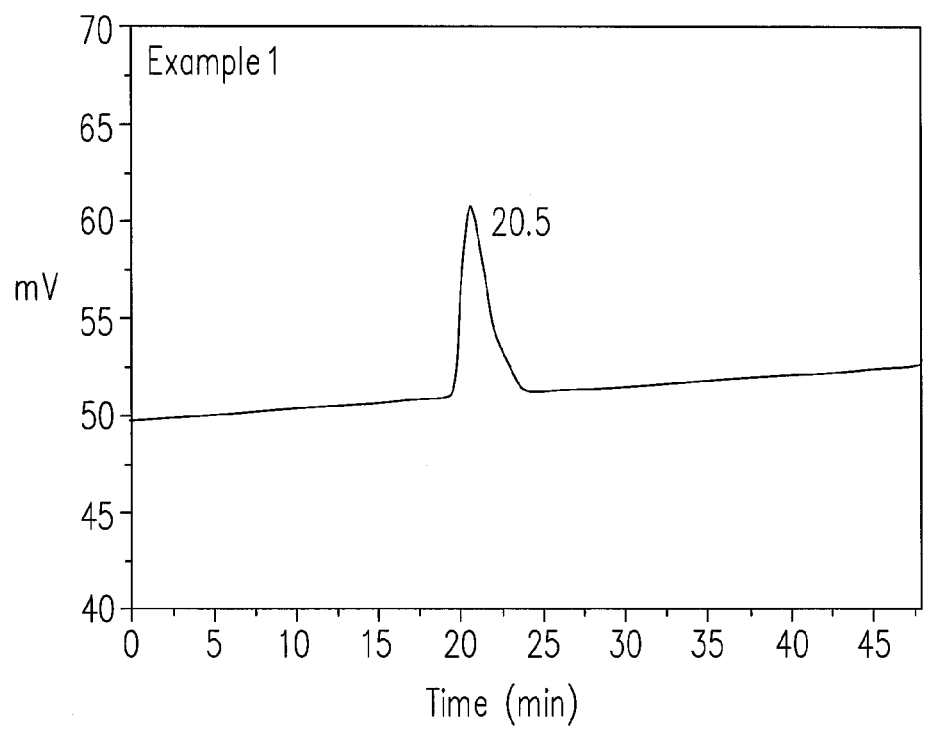
FIGS. 1-21 are GPC diagrams of meta-stable state nitrogen-containing polymers of Examples 1-21 according to the disclosure.

The disclosure provides a non-aqueous electrolyte and a lithium secondary battery containing the non-aqueous electrolyte, so as to improve the safety of the battery during overcharge or at high temperature caused by short-circuit current. Hereinafter, an electrolyte additive, the non-aqueous electrolyte, and the lithium secondary battery and preparation methods thereof are described respectively.

Electrolyte Additive and Preparation Method Thereof

The electrolyte additive of the disclosure is a meta-stable state nitrogen-containing polymer formed by reacting Compound (A) and Compound (B). Compound (A) is a monomer with a reactive terminal functional group. Compound (B) is a heterocyclic amino aromatic derivative as an initiator. A molar ratio of Compound (A) to Compound (B) is from 10:1 to 1:10

Compound (B) is represented by one of Formula (1) to Formula (9):

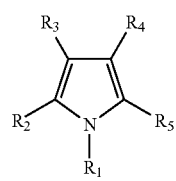
(1)

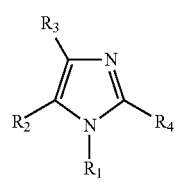
(2)

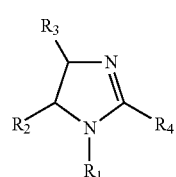
(3)

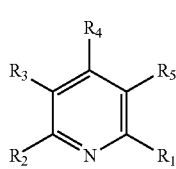
(4)

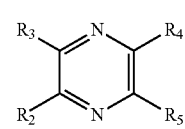
(5)

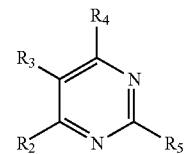
(6)

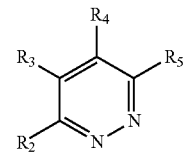
(7)

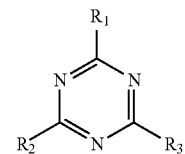
(8)

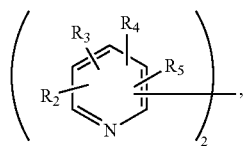
(9)

wherein $R_1$ is hydrogen, alkyl, alkenyl, phenyl, dimethylamino, or —$NH_2$, and $R_2$, $R_3$, $R_4$ and $R_5$ are each independently hydrogen, alkyl, alkenyl, halo, or —$NH_2$.

In an embodiment, examples of Compound (B) are as shown in Table 1.

TABLE 1

| Chemical Name | Structural Formula |
|---|---|
| Imidazole | |
| Pyrrole | |
| Pyridine | |
| 4-tert-butylpyridine | |

TABLE 1-continued

| Chemical Name | Structural Formula |
|---|---|
| 3-butylpyridine | |
| 4-dimethylaminopyridine | |
| 2,4,6-triamino-1,3,5,-triazine (melamine) | |
| 2,4-dimethyl-2-imidazoline | |
| Pyridazine | |
| Pyrimidine | |
| Pyradine | |

It is appreciated by persons skilled in the art that the derivative of each compound in Table 1 or any combination of the compounds in Table 1 can serve as Compound (B) for synthesizing the meta-stable state nitrogen-containing polymer of the disclosure. For example, Compound (B) may also be an imidazole derivative or a pyrrole derivative.

In an embodiment, Compound (A) is a maleimide monomer, represented by one of Formula (10) to Formula (13):

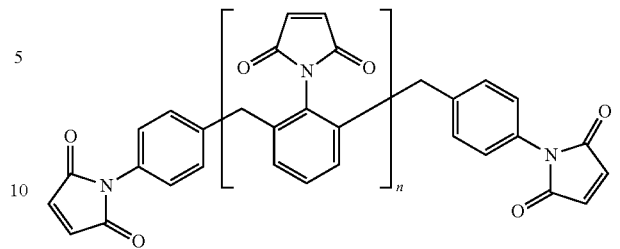
(10)

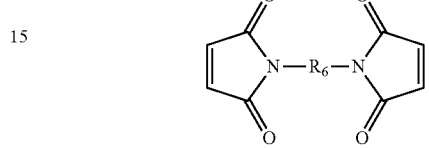
(11)

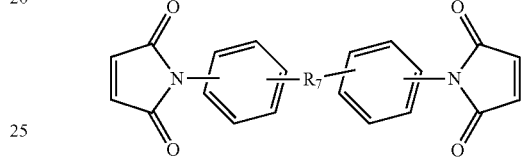
(12)

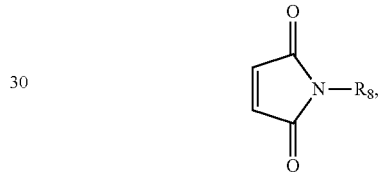
(13)

wherein n is an integer of 0 to 4; $R_6$ is —$RCH_2R'$—, —RNHR—, —$C(O)CH_2$—, —R'OR"OR'—, —$CH_2OCH_2$—, —C(O)—, —O—, —O—O—, —S—, —S—S—, —S(O)—, —$CH_2S(O)CH_2$—, —(O)S(O)—, —$CH_2(C_6H_4)CH_2$—, —$CH_2(C_6H_4)(O)$—, —$CH_2$—$(NC_2H_4)$—$C_2H_4$—, siloxane, biphenylenyl, substituted phenylene or substituted biphenylenyl, R is $C_{1-4}$ alkylene, R' is $C_{1-4}$ alkylene, biphenylenyl, substituted alkylene, substituted phenylene or substituted biphenylenyl, R" is $C_{1-4}$ alkylene, substituted alkylene, substituted phenylene or —$C_6H_4$—$C(CF_3)_2$—$C_6H_4$—, biphenylenyl or substituted biphenylenyl; $R_7$ is $R_tCH_2$—, —$CH_2$—(O)—, —$C(CH_3)_2$—, —O—, —O—O—, —S—, —S—S—, —(O)S(O)—, —$C(CF_3)_2$— or —S(O)—, $R_t$ is $C_{1-4}$ alkylene; and $R_8$ is hydrogen, $C_{1-4}$ alkyl, phenyl, benzyl, cyclohexyl, —$SO_3H$, —$C_6H_4CN$, N-methoxy carbonyl, —$(C_6H_4)$—$O(C_2H_4O)$—$CH_3$, —$C_2H_4$—$(C_2H_4O)_{11}$—$OCH_3$ or —$C(O)CH_3$.

Examples of the maleimide monomer are as shown in Table 2.

TABLE 2

| Chemical Name | Structural Formula |
|---|---|
| 4,4'-diphenylmethane bismaleimide | |

CAS NO: 13676-54-5

TABLE 2-continued

| Chemical Name | Structural Formula |
| --- | --- |
| oligomer of phenylmethane maleimide | CAS NO: 67784-74-1 |
| m-phenylene bismaleimide | CAS NO: 3006-93-7 |
| 2,2'-bis[4-(4-maleimidophenoxy)phenyl]propane | CAS NO: 79922-55-7 |
| 3,3'-dimethyl-5,5'-diethyl-4,4'-diphenylmethane bismaleimide | CAS NO: 105391-33-1 |
| 4-methyl-1,3-phenylene bismaleimide | CAS NO: 6422-83-9 |
| 1,6'-bismaleimide-(2,2,4-trimethyl)hexane | CAS NO: 39979-46-9 |
| 4,4'-diphenylether bismaleimide | CAS NO: 77529-41-0 |

TABLE 2-continued
| Chemical Name | Structural Formula |
|---|---|
| 4,4'-diphenylsulfone bismaleimide | 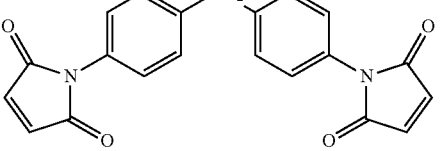<br>CAS NO: 13102-25-5 |
| 1,3-bis(3-maleimidophenoxy)benzene | 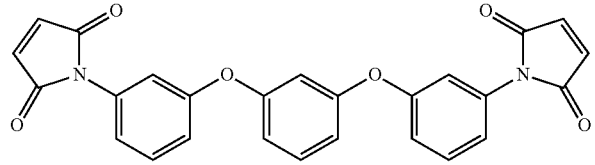<br>CAS NO: 54909-96-5 |
| 1,3-bis(4-maleimidophenoxy)benzene | 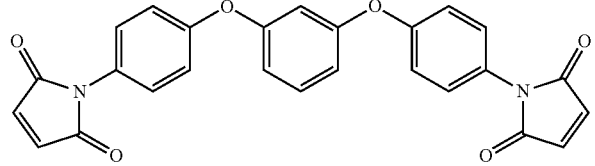<br>CAS NO: 115341-26-9 |
| 2,2-bis(4-(p-maleimidophenoxy)-phenyl)-Hexafluoropropane | 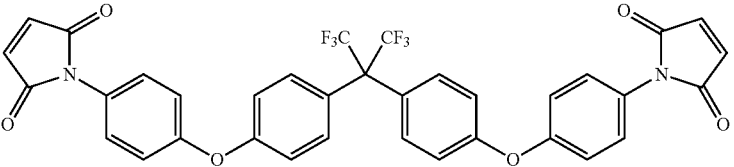 [SMILES: O=C1C=CC(=O)N1c1ccc(Oc2ccc(C(c3ccc(Oc4ccc(N5C(=O)C=CC5=O)cc4)cc3)(C(F)(F)F)C(F)(F)F)cc2)cc1] |
| 2,2-bis(p-maleimidophenyl)-hexa-fluoropropane | 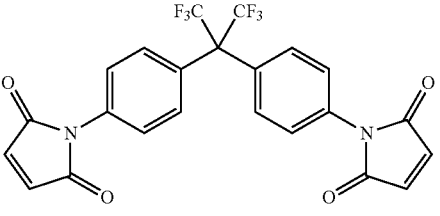 [SMILES: O=C1C=CC(=O)N1c1ccc(C(c2ccc(N3C(=O)C=CC3=O)cc2)(C(F)(F)F)C(F)(F)F)cc1] |
| 1,8-bis-maleimidodiethylene glycol | 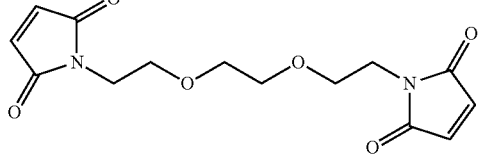 |
| tris(2-maleimidoethyl)amine | 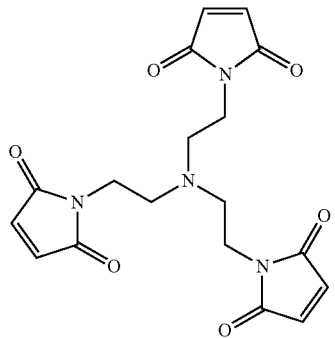 [SMILES: O=C1C=CC(=O)N1CCN(CCN1C(=O)C=CC1=O)CCN1C(=O)C=CC1=O] |

TABLE 2-continued

| Chemical Name | Structural Formula |
|---|---|
| poly(ethylene glycol(11)) 4-maleimido-phenyl methyl diether terminated | |
| 4-maleimidophenol | |
| 4-maleimido-benzenesufonic acid | |
| poly(ethylene glycol(11)) 2-maleimido-ethyl methyl diether terminated | |
| 2-maleimido propylene glycol 1-(2-methoxyethyl) ether | |
| ethylene glycol 2-maleimidopropyl methyl diether | |
| poly(dimethsiloxane) bis(3-maleimido-propyl-dimethylsilyl) terminated | |

In another embodiment, Compound (A) may also be poly(ethylene glycol)dimethacrylate, bis[[4-[(vinyloxy)methyl]cyclohexyl]methyl]isophthalate, or triallyl trimellitate.

Next, a synthesis method of the meta-stable state nitrogen-containing polymer of the disclosure is described. Firstly, Compound (A) is dissolved in a solvent, to form a mixture solution. Then, Compound (B) is added into the mixture solution in batches, and thermally polymerized by heating. The molar ratio of Compound (A) to Compound (B) is, for example, from 10:1 to 1:10, or from 1:1 to 5:1.

The solvent includes γ-butyrolactone (GBL), ethylene carbonate (EC), propylene carbonate (PC), N-methylpyrrolidone (NMP), or a suitable high-polarity solvent, and is capable of providing high dissolution ability, which is beneficial to the thermal polymerization of the reactants. Moreover, the application scope of the mixture solution is widened by the flexible variation of the solid content.

Compound (B) may be added in 2-30 equivalent batches or non-equivalent batches, and preferably in 4-16 batches; an adding time interval may be 5 minutes to 6 hours, and preferably 15 minutes to 2 hours; and the reaction may be performed at a temperature of 60-150° C., and preferably 120-140° C. Furthermore, reaction time refers to a time that the reaction lasts after Compound (B) is completely added, and may be 0.5 hour to 48 hours, and preferably 1 hour to 24 hours.

That is to say, Compound (B) is gradually added, in batches at a time interval (multiple times, e.g. twice or more times), into the mixture solution of Compound (A)/solvent system at the reaction temperature for thermal polymerization, so that gelation or a network structure generated by over reaction caused by adding of Compound (B) completely at one time can be avoided.

The meta-stable state nitrogen-containing polymer synthesized in the disclosure can be stored at room temperature (or higher) for a long time, and the viscosity thereof will not change drastically after unsealing. Furthermore, the meta-stable state nitrogen-containing polymer of the disclosure has part of the reactive functional groups remained, thus being beneficial to the subsequent processing, and optionally, the remaining reactive functional groups may be facilitated to react by heating or applying a voltage. In an embodiment, the meta-stable state nitrogen-containing polymer is re-induced to react at a temperature of 120-220° C., to convert the meta-stable state nitrogen-containing polymer into a macromolecular polymer completely. In an embodiment, the meta-stable state nitrogen-containing polymer is a narrow polydispersity polymer having a polydispersity index (PDI) of 1.1-1.7 and a GPC peak time of 19-24 minutes. In an embodiment, polydispersity index (PDI) is defined as weight average molecular weight divided by number average molecular weight (Mw/Mn).

Hereinafter, multiple synthesis examples are illustrated to verify the efficacy of the disclosure. FIGS. 1-21 are gel permeation chromatograms (GPCs) of meta-stable state nitrogen-containing polymers of Examples 1-21 according to the disclosure, in which the longitudinal axis is in millivolt (mV), and refers to signal strength (or sensitivity) of a detector, and the horizontal axis is in time.

Example 1

Firstly, oligomer of phenylmethane maleimide (Compound (A)) was dissolved in EC/PC in an amount of 3%, to form a mixture solution. Next, 2,4-dimethyl-2-imidazoline (Compound (B)) was added into the mixture solution in batches, for thermal polymerization at 130° C. for 8 hours, so as to obtain a meta-stable state nitrogen-containing polymer of Example 1. The molar ratio of 3% oligomer of phenylmethane maleimide to 2,4-dimethyl-2-imidazoline was 2:1.

The meta-stable state nitrogen-containing polymer of Example 1 was a narrow polydispersity polymer having a GPC peak time of 20.5 min and a PDI of 1.2, as shown in FIG. 1. Furthermore, the meta-stable state nitrogen-containing polymer of Example 1 was re-induced to react at a temperature of 186° C., to convert the meta-stable state nitrogen-containing polymer into a macromolecular polymer completely. Polydispersity index (PDI) is defined as weight average molecular weight divided by number average molecular weight (Mw/Mn).

Example 2

Firstly, 4,4'-diphenylmethane bismaleimide (Compound (A)) was dissolved in GBL in an amount of 5%, to form a mixture solution. Next, 2,4-dimethyl-2-imidazoline (Compound (B)) was added into the mixture solution in batches, for thermal polymerization at 100° C. for 15 hours, so as to obtain a meta-stable state nitrogen-containing polymer of Example 2. The molar ratio of 5% 4,4'-diphenylmethane bismaleimide to 2,4-dimethyl-2-imidazoline was 2:1.

Figure 2:
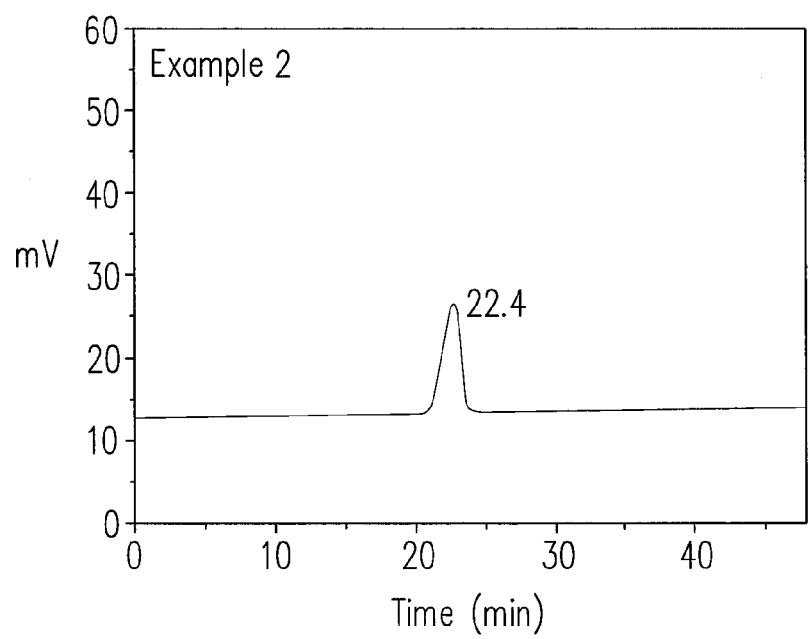

The meta-stable state nitrogen-containing polymer of Example 2 was a narrow polydispersity polymer having a GPC peak time of 22.4 min and a PDI of 1.2, as shown in FIG. 2. Furthermore, the meta-stable state nitrogen-containing polymer of Example 2 was re-induced to react at a temperature of 180° C., to convert the meta-stable state nitrogen-containing polymer into a macromolecular polymer completely.

Example 3

Firstly, oligomer of phenylmethane maleimide (Compound (A)) was dissolved in NMP in an amount of 3%, to form a mixture solution. Next, 2,4-dimethyl-2-imidazoline (Compound (B)) was added into the mixture solution in batches, for thermal polymerization at 150° C. for 3 hours, so as to obtain a meta-stable state nitrogen-containing polymer of Example 3. The molar ratio of 3% oligomer of phenylmethane maleimide to 2,4-dimethyl-2-imidazoline was 4:1.

Figure 3:
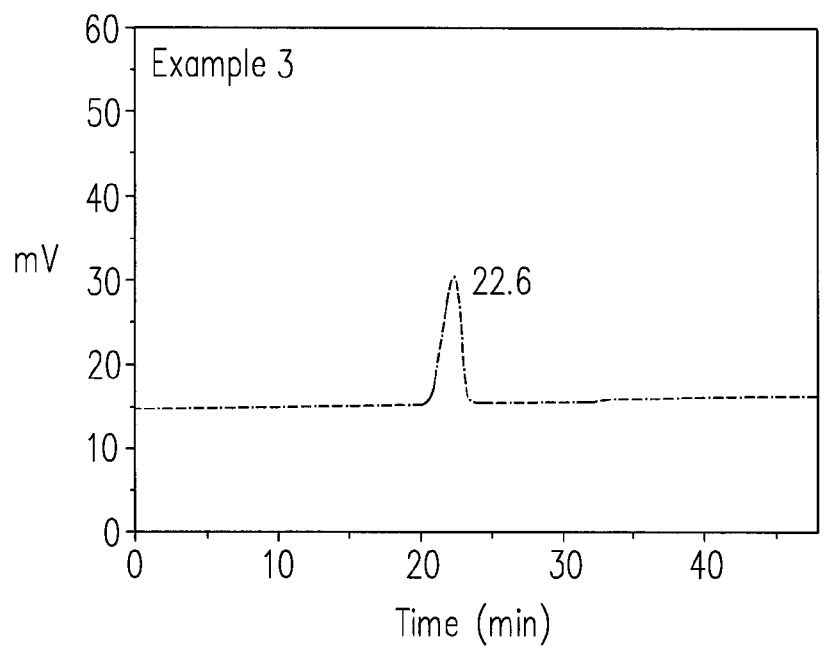

The meta-stable state nitrogen-containing polymer of Example 3 was a narrow polydispersity polymer having a GPC peak time of 22.6 min and a PDI of 1.2, as shown in FIG. 3. Furthermore, the meta-stable state nitrogen-containing polymer of Example 3 was re-induced to react at a temperature of 186° C., to convert the meta-stable state nitrogen-containing polymer into a macromolecular polymer completely.

Example 4

Firstly, 4,4'-diphenylmethane bismaleimide (Compound (A)) was dissolved in NMP in an amount of 3%, to form a mixture solution. Next, imidazole (Compound (B)) was added into the mixture solution in batches, for thermal polymerization at 130° C. for 8 hours, so as to obtain a meta-stable state nitrogen-containing polymer of Example 4. The molar ratio of 3% 4,4'-diphenylmethane bismaleimide to imidazole was 4:1.

Figure 4:
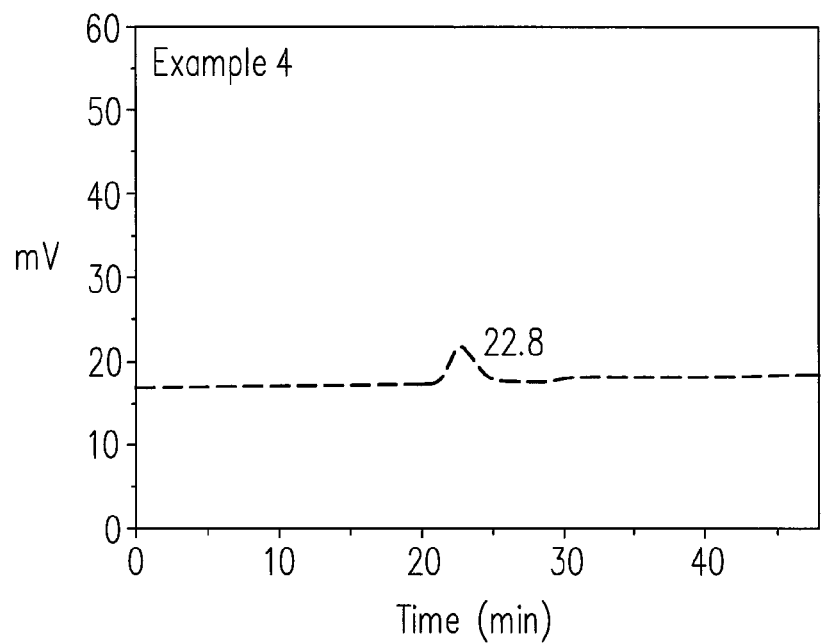

The meta-stable state nitrogen-containing polymer of Example 4 was a narrow polydispersity polymer having a GPC peak time of 22.8 min and a PDI of 1.3, as shown in FIG. 4. Furthermore, the meta-stable state nitrogen-containing polymer of Example 4 was re-induced to react at a temperature of 200° C., to convert the meta-stable state nitrogen-containing polymer into a macromolecular polymer completely.

Example 5

Firstly, 1,6'-bismaleimide-(2,2,4-trimethyl)hexane (Compound (A)) was dissolved in GBL in an amount of 3%, to form a mixture solution. Next, pyridazine (Compound (B)) was added into the mixture solution in batches, for thermal polymerization at 100° C. for 12 hours, so as to obtain a meta-stable state nitrogen-containing polymer of Example 5. The molar ratio of 3% 1,6'-bismaleimide-(2,2,4-trimethyl)hexane to pyridazine was 2:1.

Figure 5:
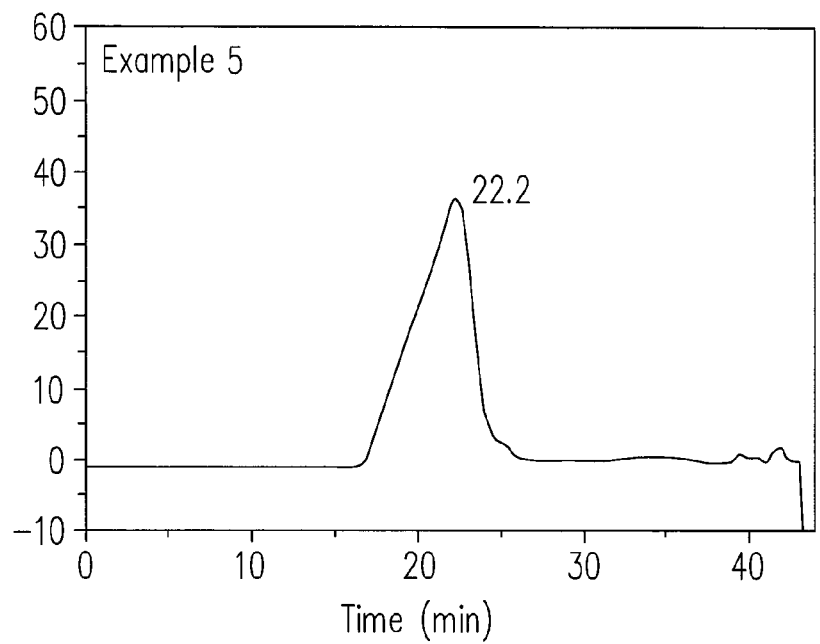

The meta-stable state nitrogen-containing polymer of Example 5 was a narrow polydispersity polymer having a GPC peak time of 22.2 min and a PDI of 1.5, as shown in FIG. 5. Furthermore, the meta-stable state nitrogen-containing polymer of Example 5 was re-induced to react at a temperature of 190° C., to convert t the meta-stable state nitrogen-containing polymer into a macromolecular polymer completely.

Example 6

Firstly, 2,2'-bis[4-(4-maleimidophenoxy)phenyl]propane (Compound (A)) was dissolved in GBL in an amount of 3%, to form a mixture solution. Next, pyridine (Compound (B)) was added into the mixture solution in batches, for thermal polymerization at 60° C. for 24 hours, so as to obtain a meta-stable state nitrogen-containing polymer of Example 6. The molar ratio of 3% 2,2'-bis[4-(4-maleimidophenoxy)phenyl]propane to pyridine was 4:1.

Figure 6:
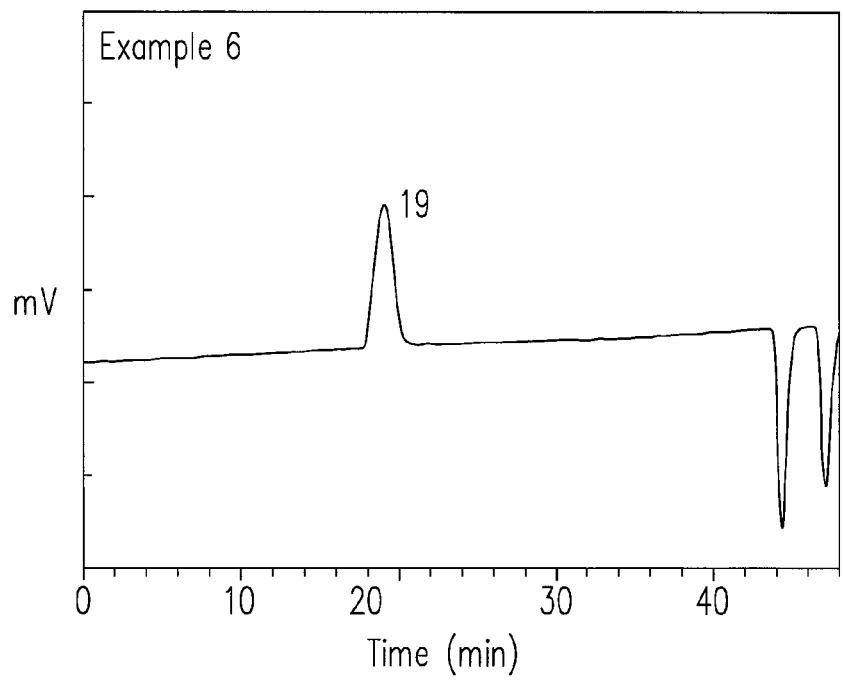

The meta-stable state nitrogen-containing polymer of Example 6 was a narrow polydispersity polymer having a GPC peak time of 19 min and a PDI of 1.2, as shown in FIG. 6. Furthermore, the meta-stable state nitrogen-containing polymer of Example 6 was re-induced to react at a temperature of 180° C., to convert the meta-stable state nitrogen-containing polymer into a macromolecular polymer completely.

Example 7

Firstly, oligomer of phenylmethane maleimide (Compound (A)) was dissolved in EC/PC in an amount of 5%, to form a mixture solution. Next, 2,4,6-triamino-1,3,5,-triazine (Compound (B)) was added into the mixture solution in batches, for thermal polymerization at 130° C. for 12 hours, so as to obtain a meta-stable state nitrogen-containing polymer of Example 7. The molar ratio of 5% oligomer of phenylmethane maleimide to 2,4,6-triamino-1,3,5,-triazine was 2:1.

Figure 7:
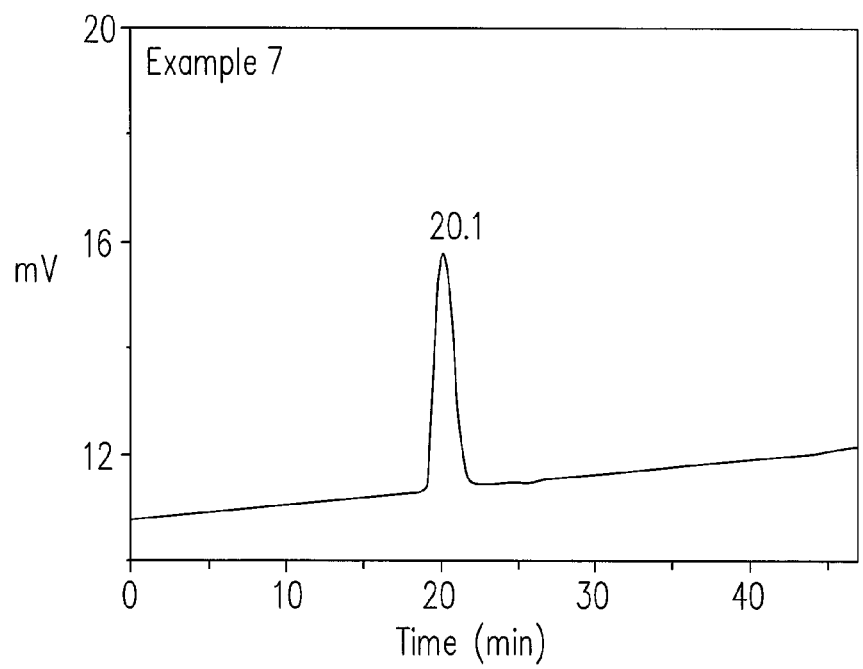

The meta-stable state nitrogen-containing polymer of Example 7 was a narrow polydispersity polymer having a GPC peak time of 20.1 min and a PDI of 1.1, as shown in FIG. 7. Furthermore, the meta-stable state nitrogen-containing polymer of Example 7 was re-induced to react at a temperature of 190° C., to convert the meta-stable state nitrogen-containing polymer into a macromolecular polymer completely.

Example 8

Firstly, oligomer of phenylmethane maleimide (Compound (A)) was dissolved in EC/PC in an amount of 5%, to form a mixture solution. Next, 2,4-dimethyl-2-imidazoline (Compound (B)) was added into the mixture solution in batches, for thermal polymerization at 80° C. for 18 hours, so as to obtain a meta-stable state nitrogen-containing polymer of Example 8. The molar ratio of 5% oligomer of phenylmethane maleimide to 2,4-dimethyl-2-imidazoline was 10:1.

Figure 8:
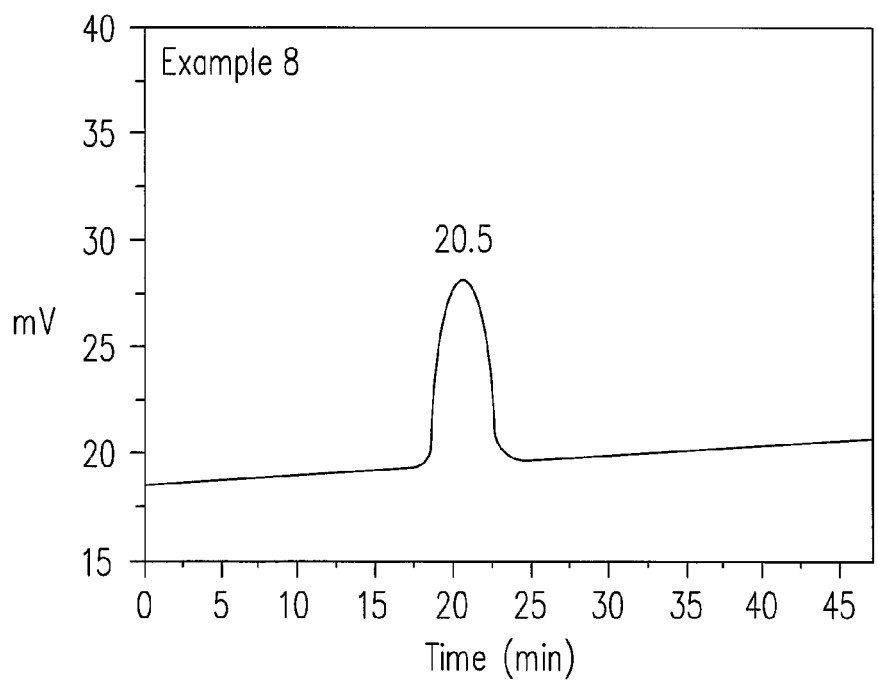

The meta-stable state nitrogen-containing polymer of Example 8 was a narrow polydispersity polymer having a GPC peak time of 20.5 min and a PDI of 1.5, as shown in FIG. 8. Furthermore, the meta-stable state nitrogen-containing polymer of Example 8 was re-induced to react at a temperature of 170° C., to convert the meta-stable state nitrogen-containing polymer into a macromolecular polymer completely.

Example 9

Firstly, 2,2'-bis[4-(4-maleimidophenoxy)phenyl]propane (Compound (A)) was dissolved in GBL in an amount of 5%, to form a mixture solution. Next, 4-tert-butylpyridine (Compound (B)) was added into the mixture solution in batches, for thermal polymerization at 60° C. for 24 hours, so as to obtain a meta-stable state nitrogen-containing polymer of Example 9. The molar ratio of 5% 2,2'-bis[4-(4-maleimidophenoxy)phenyl]propane to 4-tert-butylpyridine was 4:1.

Figure 9:
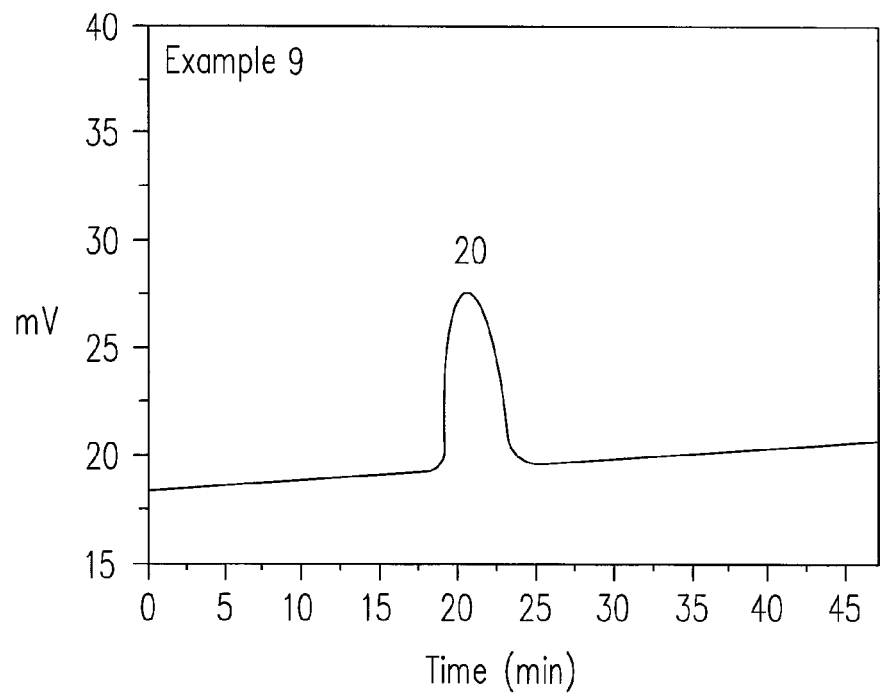

The meta-stable state nitrogen-containing polymer of Example 9 was a narrow polydispersity polymer having a GPC peak time of 20 min and a PDI of 1.5, as shown in FIG. 9. Furthermore, the meta-stable state nitrogen-containing polymer of Example 9 was re-induced to react at a temperature of 120° C., to convert the meta-stable state nitrogen-containing polymer into a macromolecular polymer completely.

Example 10

Firstly, 4,4'-diphenylmethane bismaleimide and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 10. The molar ratio of 3% mixture solution to 2,4-dimethyl-2-imidazoline was 2:1.

Figure 10:
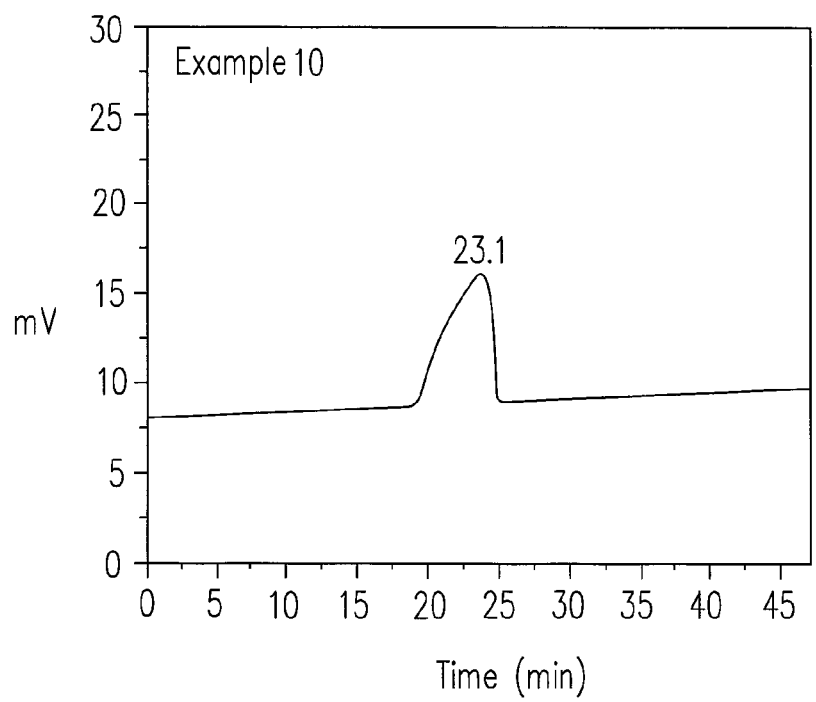

The meta-stable state nitrogen-containing polymer of Example 10 was a narrow polydispersity polymer having a GPC peak time of 23.1 min and a PDI of 1.5, as shown in FIG. 10. Furthermore, the meta-stable state nitrogen-containing polymer of Example 10 was re-induced to react at a temperature of 200° C., to convert the meta-stable state nitrogen-containing polymer into a macromolecular polymer completely.

Example 11

Firstly, 4,4'-diphenylmethane bismaleimide and 2,2-bis(4-(p-maleimidophenoxy)-phenyl)-hexafluoropropane in a molar ratio of 2:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 11. The molar ratio of 3% mixture solution to 2,4-dimethyl-2-imidazoline was 2:1.

Figure 11:
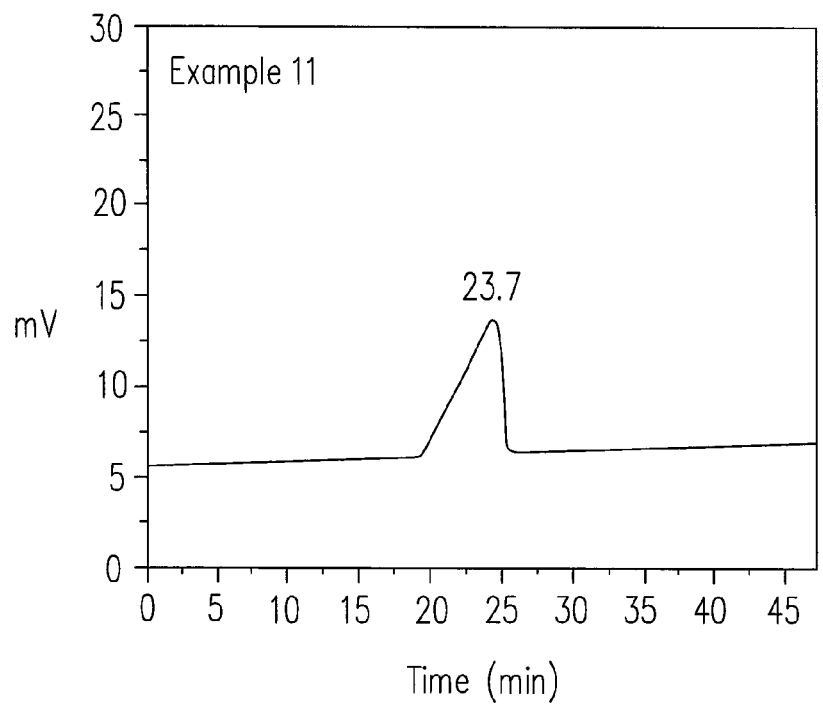

The meta-stable state nitrogen-containing polymer of Example 11 was a narrow polydispersity polymer having a GPC peak time of 23.7 min and a PDI of 1.5, as shown in FIG. 11. Furthermore, the meta-stable state nitrogen-containing polymer of Example 11 was re-induced to react at a temperature of 205° C., to convert the meta-stable state nitrogen-containing polymer into a macromolecular polymer completely.

Example 12

Firstly, 4,4'-diphenylmethane bismaleimide and 1,8-bismaleimidodiethylene glycol in a molar ratio of 2:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 12. The molar ratio of 3% mixture solution to 2,4-dimethyl-2-imidazoline was 2:1.

Figure 12:
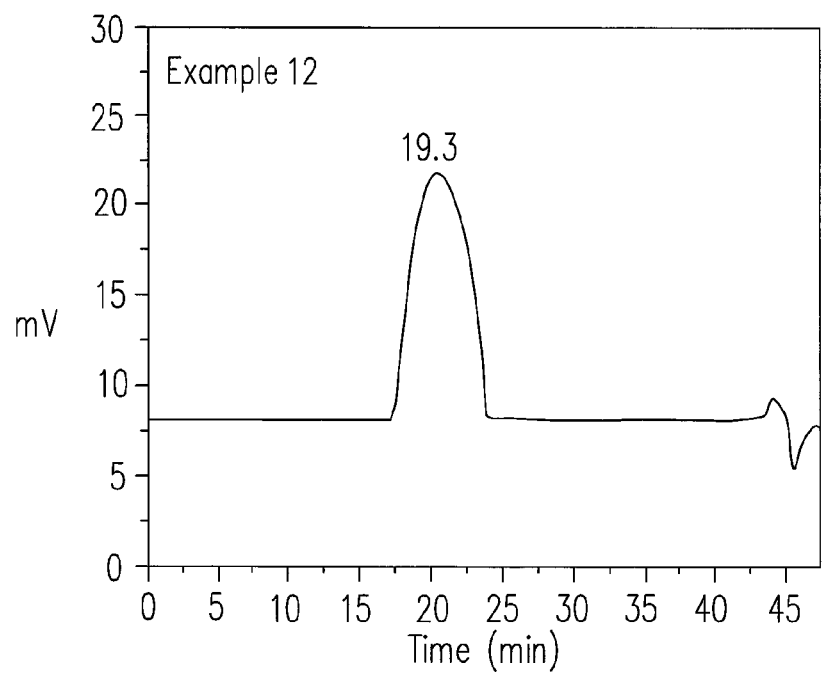

The meta-stable state nitrogen-containing polymer of Example 12 was a narrow polydispersity polymer having a GPC peak time of 19.3 min and a PDI of 1.5, as shown in FIG. 12. Furthermore, the meta-stable state nitrogen-containing polymer of Example 12 was re-induced to react at a temperature of 180° C., to convert the meta-stable state nitrogen-containing polymer into a macromolecular polymer completely.

Example 13

Firstly, tris(2-maleimidoethyl)amine and 2,2-bis(4-(p-maleimidophenoxy)-phenyl)-hexafluoropropane in a molar ratio of 2:1 were dissolved in EC/PC, to form a 3% mixture solution. Next, 2,4-dimethyl-2-imidazoline was added into the mixture solution in batches, for thermal polymerization at 130° C. for 4 hours, so as to obtain a meta-stable state nitrogen-containing polymer of Example 13. The molar ratio of 3% mixture solution to 2,4-dimethyl-2-imidazoline was 2:1.

Figure 13:
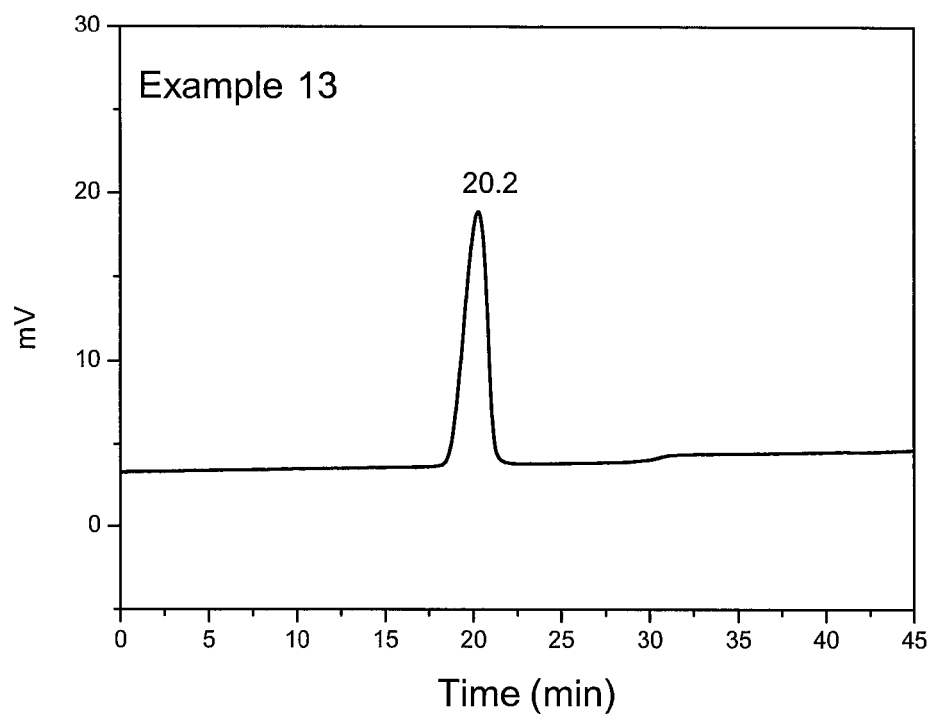

The meta-stable state nitrogen-containing polymer of Example 13 was a narrow polydispersity polymer having a GPC peak time of 20.2 min and a PDI of 1.1, as shown in FIG. 13. Furthermore, the meta-stable state nitrogen-containing polymer of Example 13 was re-induced to react at a temperature of 160° C., to convert the meta-stable state nitrogen-containing polymer into a macromolecular polymer completely.

Example 14

Firstly, 1,8-bis-maleimidodiethylene glycol and 2,2-bis(p-maleimidophenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 120° C. for 6 hours, so as to obtain a meta-stable state nitrogen-containing polymer of Example 14. The molar ratio of 3% mixture solution to 2,4-dimethyl-2-imidazoline was 2:1.

Figure 14:
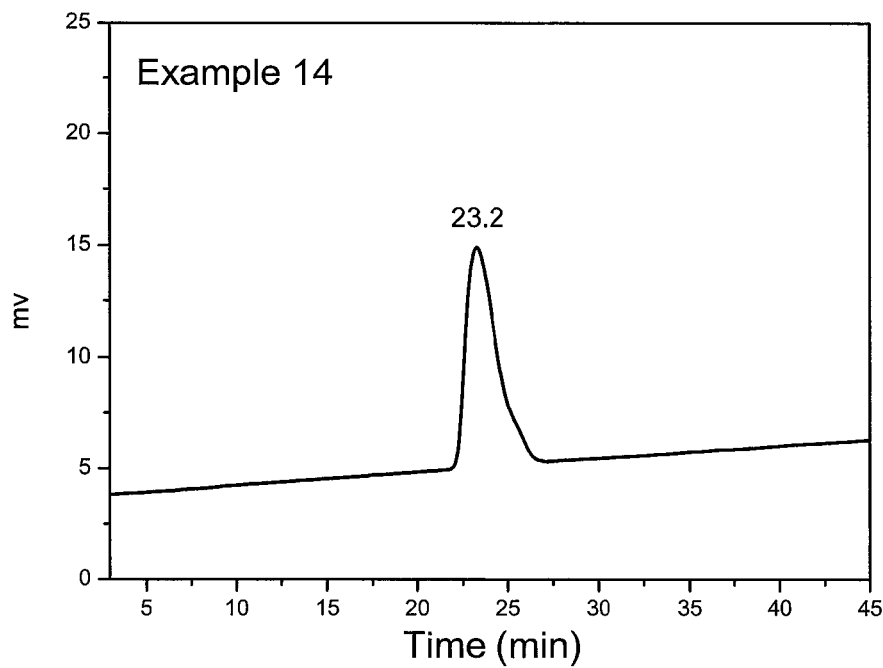

The meta-stable state nitrogen-containing polymer of Example 14 was a narrow polydispersity polymer having a GPC peak time of 23.2 min and a PDI of 1.2, as shown in FIG. 14. Furthermore, the meta-stable state nitrogen-containing polymer of Example 14 was re-induced to react at a temperature of 220° C., to convert the meta-stable state nitrogen-containing polymer into a macromolecular polymer completely.

Example 15

Firstly, 4,4'-diphenylether bismaleimide and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 100° C. for 15 hours, so as to obtain a meta-stable state nitrogen-containing polymer of Example 15. The molar ratio of 3% mixture solution to 2,4-dimethyl-2-imidazoline was 2:1.

Figure 15:
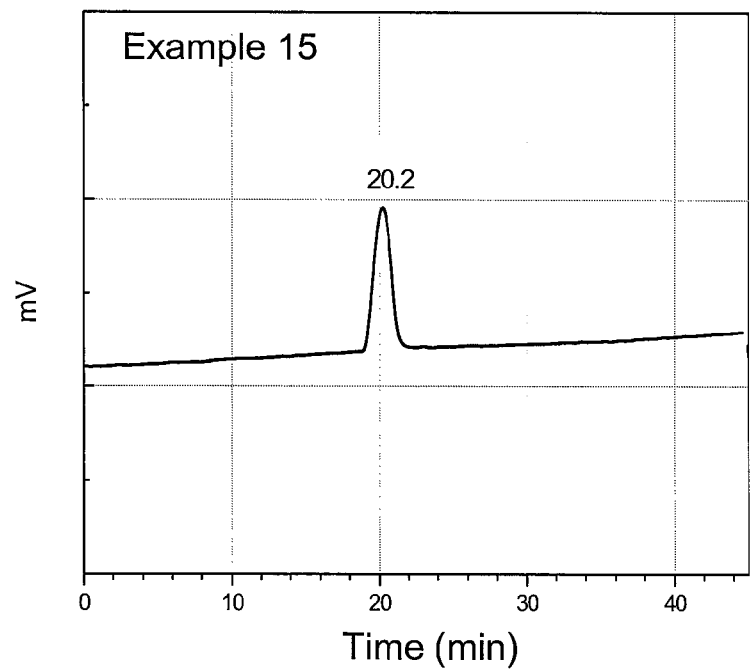

The meta-stable state nitrogen-containing polymer of Example 15 was a narrow polydispersity polymer having a GPC peak time of 20.2 min and a PDI of 1.1, as shown in FIG. 15. Furthermore, the meta-stable state nitrogen-containing polymer of Example 15 was re-induced to react at a temperature of 185° C., to convert the meta-stable state nitrogen-containing polymer into a macromolecular polymer completely.

Example 16

Firstly, 4,4'-diphenylsulfone bismaleimide and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 16. The molar ratio of 3% mixture solution to 2,4-dimethyl-2-imidazoline was 2:1.

Figure 16:
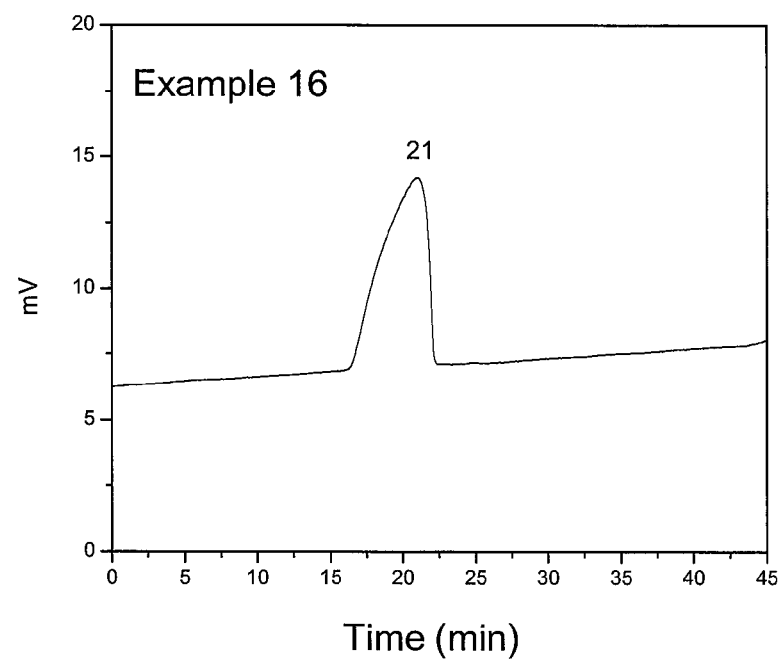

The meta-stable state nitrogen-containing polymer of Example 16 was a narrow polydispersity polymer having a GPC peak time of 21 min and a PDI of 1.6, as shown in FIG. 16. Furthermore, the meta-stable state nitrogen-containing polymer of Example 16 was re-induced to react at a temperature of 180° C., to convert the meta-stable state nitrogen-containing polymer into a macromolecular polymer completely.

Example 17

Firstly, 1,3-bis(3-maleimidophenoxy)benzene and 2,2-bis(4-(p-maleimidophenoxy)-phenyl)-hexafluoropropane in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 17. The molar ratio of 3% mixture solution to 2,4-dimethyl-2-imidazoline was 2:1.

Figure 17:
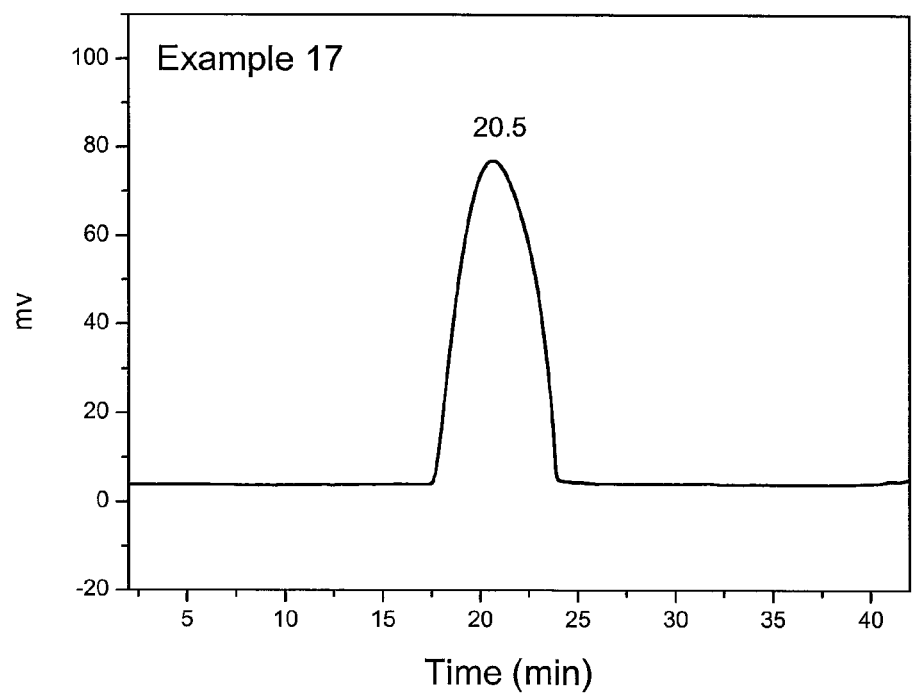

The meta-stable state nitrogen-containing polymer of Example 17 was a narrow polydispersity polymer having a GPC peak time of 20.5 min and a PDI of 1.6, as shown in FIG. 17. Furthermore, the meta-stable state nitrogen-containing polymer of Example 17 was re-induced to react at a temperature of 205° C., to convert the meta-stable state nitrogen-containing polymer into a macromolecular polymer completely.

Example 18

Firstly, tris(2-maleimidoethyl)amine was dissolved in EC/PC in an amount of 3%, to form a mixture solution. Next, 2,4-dimethyl-2-imidazoline was added into the mixture solution in batches, for thermal polymerization at 130° C. for 8 hours, so as to obtain a meta-stable state nitrogen-containing polymer of Example 18. The molar ratio of 3% tris(2-maleimidoethyl)amine to 2,4-dimethyl-2-imidazoline 2:1.

Figure 18:
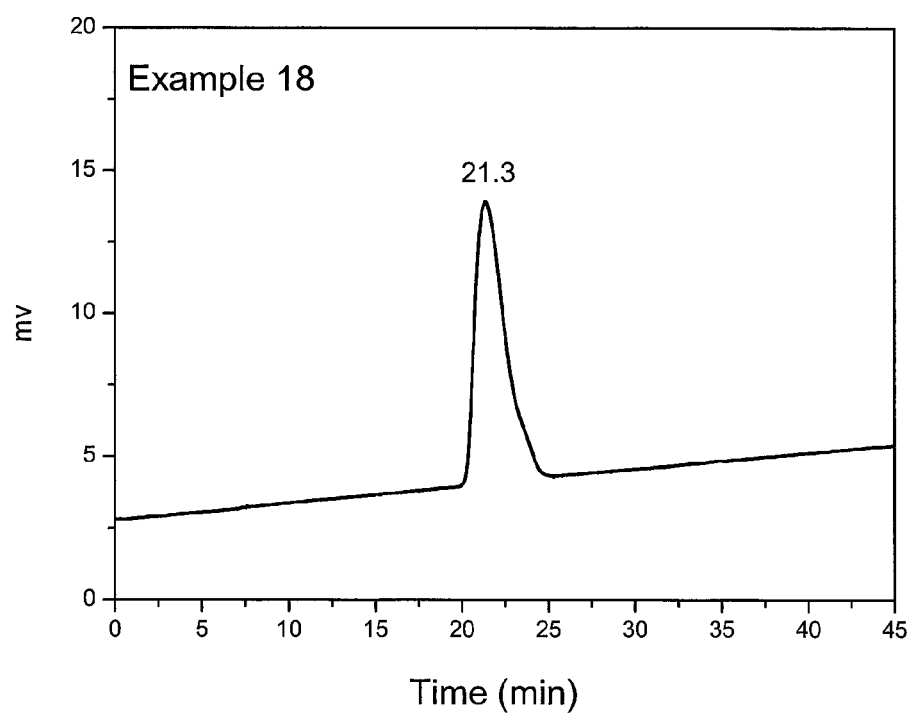

The meta-stable state nitrogen-containing polymer of Example 18 was a narrow polydispersity polymer having a GPC peak time of 21.3 min and a PDI of 1.2, as shown in FIG. 18. Furthermore, the meta-stable state nitrogen-containing polymer of Example 9 was re-induced to react at a temperature of 195° C., to convert the meta-stable state nitrogen-containing polymer into a macromolecular polymer completely.

Example 19

Firstly, 1,8-bis-maleimidodiethylene glycol and 4-maleimido-benzenesulfonic acid in a molar ratio of 4:1 were dissolved in EC/PC, to form a 3% mixture solution. Next, 2,4-dimethyl-2-imidazoline was added into the mixture solution in batches, for thermal polymerization at 130° C. for 8 hours, so as to obtain a meta-stable state nitrogen-containing polymer of Example 19. The molar ratio of 3% mixture solution to 2,4-dimethyl-2-imidazoline was 2:1.

Figure 19:
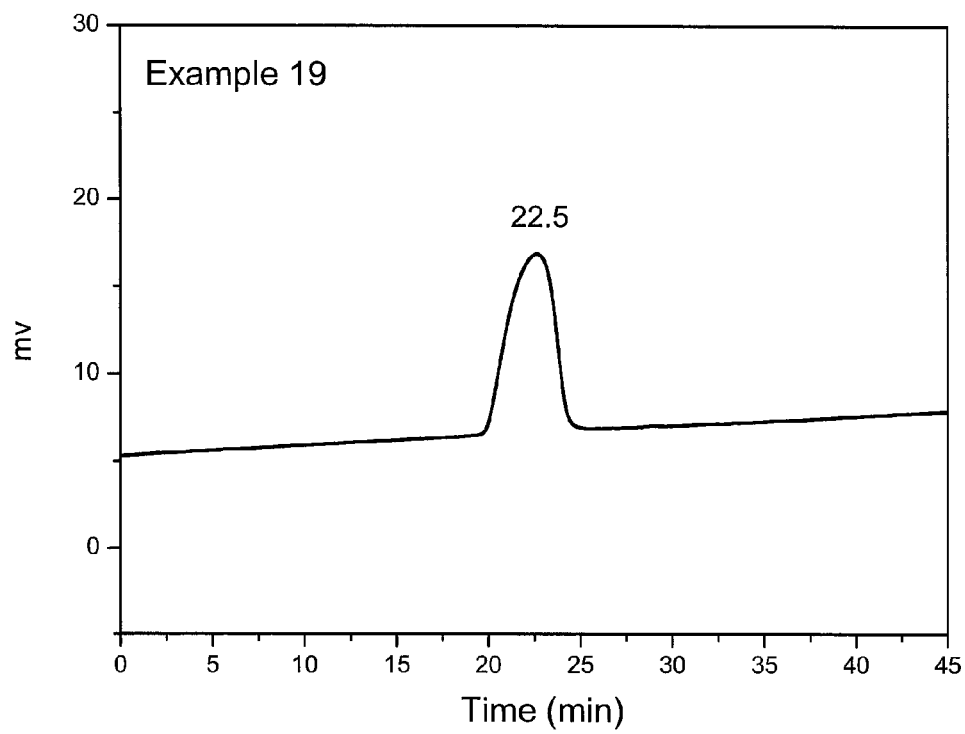

The meta-stable state nitrogen-containing polymer of Example 19 was a narrow polydispersity polymer having a GPC peak time of 22.5 min and a PDI of 1.3, as shown in FIG. 19. Furthermore, the meta-stable state nitrogen-containing polymer of Example 19 was re-induced to react at a temperature of 198° C., to convert the meta-stable state nitrogen-containing polymer into a macromolecular polymer completely.

Example 20

Firstly, 1,8-bis-maleimidodiethylene glycol and 2,2-bis(4-(p-maleimidophenoxy)-phenyl)-hexafluoropropane in a molar ratio of 4:1 were dissolved in GBL, to form a 3% mixture solution. Next, 2,4-dimethyl-2-imidazoline was added into the mixture solution in batches, for thermal polymerization at 120° C. for 8 hours, so as to obtain a meta-stable state nitrogen-containing polymer of Example 20. The molar ratio of 3% mixture solution to 2,4-dimethyl-2-imidazoline was 2:1.

Figure 20:
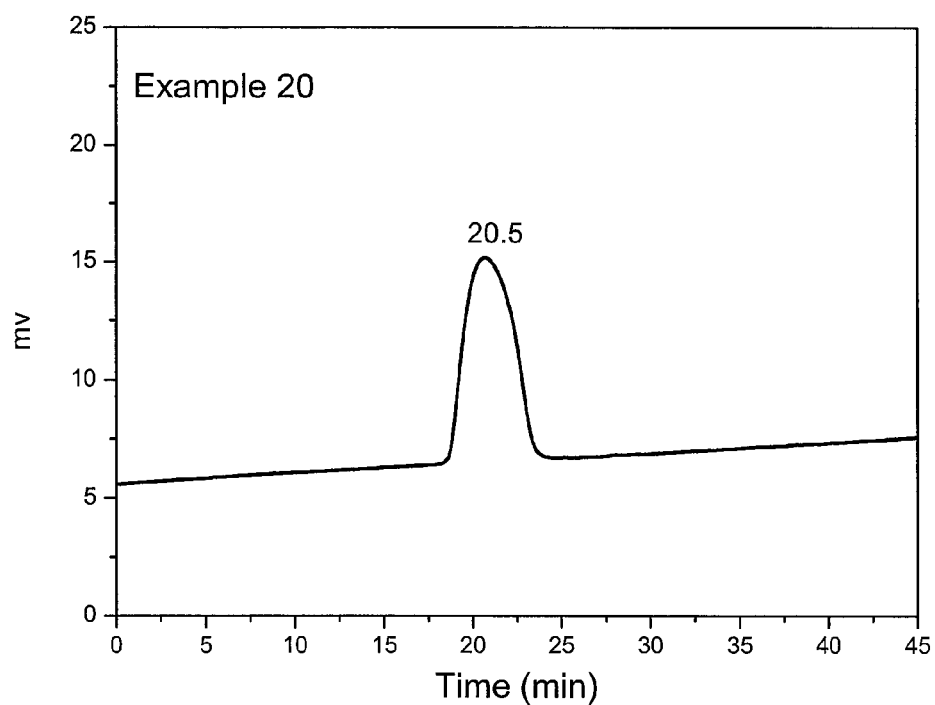

The meta-stable state nitrogen-containing polymer of Example 20 was a narrow polydispersity polymer having a GPC peak time of 20.5 min and a PDI of 1.3, as shown in FIG. 20. Furthermore, the meta-stable state nitrogen-containing polymer of Example 20 was re-induced to react at a temperature of 202° C., to convert the meta-stable state nitrogen-containing polymer into a macromolecular polymer completely.

Example 21

Firstly, tris(2-maleimidoethyl)amine and 4-maleimidophenol in a molar ratio of 2:1 were dissolved in GBL, to form a 3% mixture solution. Next, 4-tert-butylpyridine was added into the mixture solution in batches, for thermal polymerization at 110° C. for 6 hours, so as to obtain a meta-stable state nitrogen-containing polymer of Example 21. The molar ratio of 3% mixture solution to 4-tert-butylpyridine was 2:1.

Figure 21:
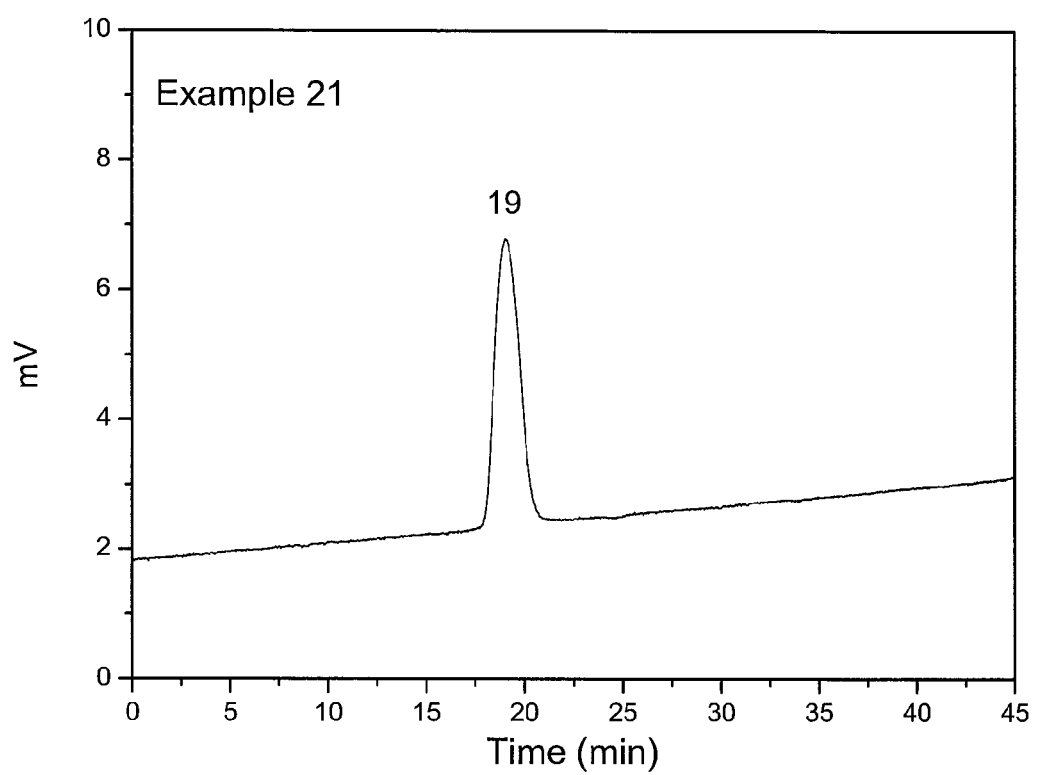

The meta-stable state nitrogen-containing polymer of Example 21 was a narrow polydispersity polymer having a GPC peak time of 19 min and a PDI of 1.1, as shown in FIG. 21. Furthermore, the meta-stable state nitrogen-containing polymer of Example 21 was re-induced to react at a temperature of 175° C., to convert the meta-stable state nitrogen-containing polymer into a macromolecular polymer completely.

Table 3 summaries synthesis conditions and experimental results of Examples 1-21.

TABLE 3

| Example | Compound (A)/Compound (B) (molar ratio) | Solvent | Reaction conditions | GPC peak time (min) | PDI | re-inducing temperature |
|---|---|---|---|---|---|---|
| 1 | 3% oligomer of phenylmethane maleimide/ 2,4-dimethyl-2-imidazoline (2:1) | EC/PC | 130° C., 8 h | 20.5 | 1.2 | 186° C. |
| 2 | 5% 4,4'-diphenylmethane bismaleimide/ 2,4-dimethyl-2-imidazoline (2:1) | GBL | 100° C., 15 h | 22.4 | 1.2 | 180° C. |
| 3 | 3% oligomer of phenylmethane maleimide/ 2,4-dimethyl-2-imidazoline (4:1) | NMP | 150° C., 3 h | 22.6 | 1.2 | 186° C. |
| 4 | 3% 4,4'-diphenylmethane bismaleimide/ imidazole (4:1) | NMP | 130° C., 8 h | 22.8 | 1.3 | 200° C. |
| 5 | 3% 1,6'-bismaleimide-(2,2,4-trimethyl)hexane/ pyridazine (2:1) | GBL | 100° C. 12 h | 22.2 | 1.5 | 190° C. |
| 6 | 3% 2,2'-bis[4-(4-maleimidophenoxy)phenyl]propane/ pyridine (4:1) | GBL | 60° C., 24 h | 19 | 1.2 | 180° C. |
| 7 | 5% oligomer of phenylmethane maleimide/ 2,4,6-triamino-1,3,5,-triazine (2:1) | EC/PC | 130° C., 12 h | 20.1 | 1.1 | 190° C. |
| 8 | 5% oligomer of phenylmethane maleimide/ 2,4-dimethyl-2-imidazoline (10:1) | EC/PC | 80° C., 18 h | 20.5 | 1.5 | 170° C. |
| 9 | 5% 2,2'-bis[4-(4-maleimidophenoxy)phenyl]propane/ 4-tert-butylpyridine (4:1) | GBL | 60° C., 24 h | 20 | 1.5 | 120° C. |
| 10 | 3% [4,4'-diphenylmethane bismaleimide: 2,2-bis(4-(p-maleimidophenoxy)-phenyl)-hexafluoro propane (4:1)]/2,4-dimethyl-2-imidazoline(2:1) | EC/PC | 130° C. 8 h | 23.1 | 1.5 | 200° C. |
| 11 | 3% [4,4'-diphenylmethane bismaleimide: 2,2-bis(4-(p-maleimidophenoxy)-phenyl)-hexafluoro propane (2:1)]/2,4-dimethyl-2-imidazoline(2:1) | EC/PC | 130° C. 8 h | 23.7 | 1.5 | 205° C. |
| 12 | 3% [4,4'-diphenylmethane bismaleimide: 1,8-bis-maleimidodiethylene glycol (2:1)]/2,4-dimethyl-2-imidazoline(2:1) | EC/PC | 130° C. 8 h | 19.3 | 1.5 | 180° C. |
| 13 | 3% [tris(2-maleimidoethyl)amine: 2,2-bis(4-(p-maleimidophenoxy)-phenyl)-hexafluoro propane (2:1)]/2,4-dimethyl-2-imidazoline (2:1) | EC/PC | 130° C. 4 h | 20.2 | 1.1 | 160° C. |
| 14 | 3% [1,8-bis-maleimidodiethylene glycol: 2,2-bis(p-maleimidophenyl)-hexafluoropropane (4:1)]/2,4-dimethyl-2-imidazoline (2:1) | EC/PC | 120° C. 6 h | 23.2 | 1.2 | 220° C. |
| 15 | 3% [4,4'-diphenylether bismaleimide: 2,2-bis(4-(p-maleimidophenoxy)-phenyl)-hexafluoro propane (4:1)]/2,4-dimethyl-2-imidazoline(2:1) | EC/PC | 100° C. 15 h | 20.2 | 1.1 | 185° C. |
| 16 | 3% [4,4'-diphenylsulfone bismaleimide: 2,2-bis(4-(p-maleimidophenoxy)-phenyl)-hexafluoro propane (4:1)]/2,4-dimethyl-2-imidazoline(2:1) | EC/PC | 130° C. 8 h | 21 | 1.6 | 180° C. |
| 17 | 3% [1,3-bis(3-maleimidophenoxy)benzene: 2,2-bis(4-(p-maleimidophenoxy)-phenyl)-hexafluoro propane (4:1)]/2,4-dimethyl-2-imidazoline(2:1) | EC/PC | 130° C. 8 h | 20.5 | 1.6 | 205° C. |
| 18 | 3% tris(2-maleimidoethyl)amine/ 2,4-dimethyl-2-imidazoline(2:1) | EC/PC | 130° C. 8 h | 21.3 | 1.2 | 195° C. |
| 19 | 3% [1,8-bis-maleimidodiethylene glycol: 4-maleimido-benzenesufonic acid(4:1)]/ 2,4-dimethyl-2-imidazoline(2:1) | EC/PC | 130° C. 8 h | 22.5 | 1.3 | 198° C. |
| 20 | 3% [1,8-bis-maleimidodiethylene glycol: 2,2-bis(4-(p-maleimidophenoxy)-phenyl)-hexafluoro propane (4:1)]/2,4-dimethyl-2-imidazoline(2:1) | GBL | 120° C. 8 h | 20.5 | 1.3 | 202° C. |
| 21 | 3% [tris(2-maleimidoethyl)amine: 4-maleimidophenol (2:1)]/4-tert-butylpyridine(2:1) | GBL | 110° C. 6 h | 19 | 1.1 | 175° C. |

Figure 22:
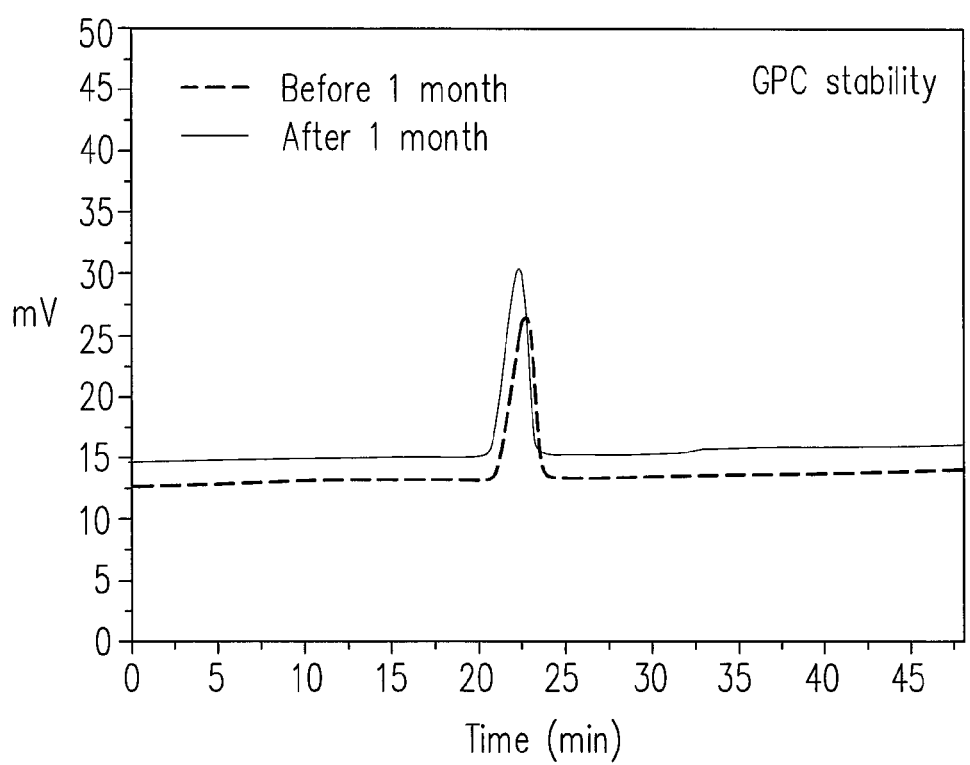
FIG. 22 is a diagram illustrating the variation of GPC of the meta-stable state nitrogen-containing polymer of Example 3 according to the disclosure over time.
Figure 23:
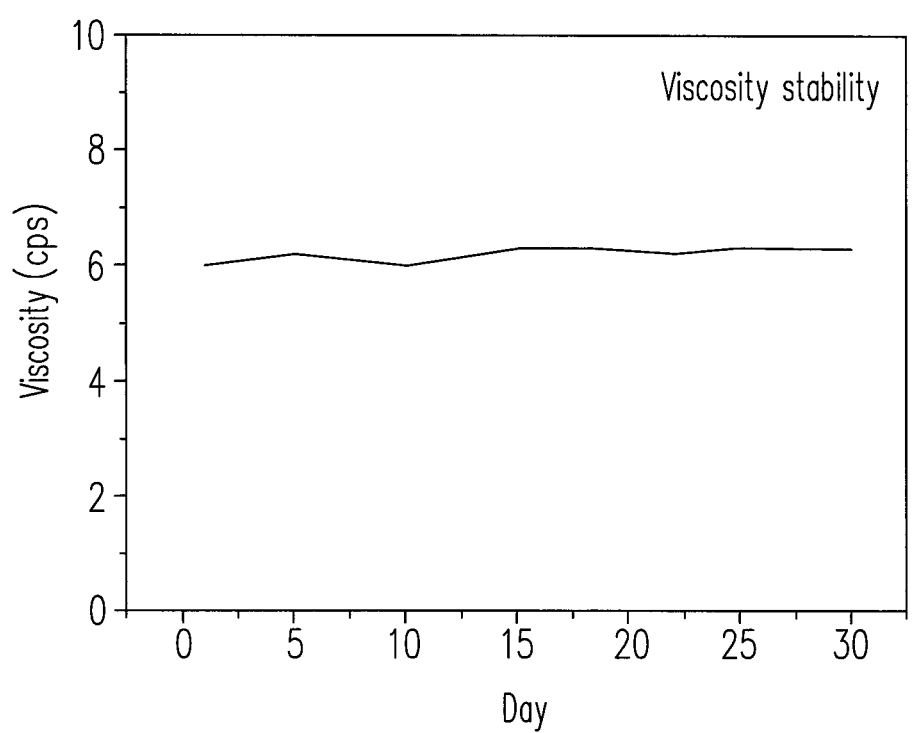
FIG. 23 is a diagram illustrating the variation of viscosity of the meta-stable state nitrogen-containing polymer of Example 3 according to the disclosure over time.

Furthermore, GPC stability test and viscosity stability test were also performed on the meta-stable state nitrogen-containing polymer of Example 3, as shown in FIGS. 22-23. Referring to FIG. 22, the meta-stable state nitrogen-containing polymer of Example 3 was stored at 55° C. for 1 month, wherein the PDI of the first day is 1.2, and the PDI of the 30$^{th}$ day is 1.21, and the variance of PDI of the meta-stable state nitrogen-containing polymer of Example 3 is lower than 2% after being stored at 55° C. for 1 month. Referring to FIG. 23, the meta-stable state nitrogen-containing polymer of Example 3 was stored at 55° C. for 1 month, wherein the viscosity of the first day is 6.2 cP, and the viscosity of the 30$^{th}$ day is 6.3 cP, and the variance of viscosity of the meta-stable state nitrogen-containing polymer of Example 3 is lower than 2% after being stored at 55° C. for 1 month.

In the above embodiments, Compound (B) is described with a heterocyclic amino aromatic derivative as a nucleophilic initiator as an example; however, the disclosure is not limited thereto. Persons of ordinary skill in the art should appreciate that, Compound (B) may also be a tertiary amine or a secondary amine, which is reacted with Compound (A) (that is, a monomer with a reactive terminal functional group), to generate a meta-stable state nitrogen-containing polymer.

Based on the above, the meta-stable state nitrogen-containing polymer of the disclosure may be stored at room temperature (or a temperature higher than room temperature) for a long time (e.g. at least one month), while maintaining the stable viscosity and particle size distribution. Furthermore, the meta-stable state nitrogen-containing polymer has part of the reactive functional groups remained, which is beneficial to the subsequent processing, and optionally, the remaining reactive function groups may be facilitated to react by heating or applying a voltage.

Hereinafter, by using the characteristic that the terminal reactive functional group will react when a voltage is applied, the meta-stable state nitrogen-containing polymer is used as an additive of the electrolyte of a lithium secondary battery, to form a protective film on a positive electrode surface during overcharge, so as to improve the safety of the lithium secondary battery.

Non-Aqueous Electrolyte and Preparation Method Thereof

The non-aqueous electrolyte of the disclosure contains a lithium salt, an organic solvent, and the electrolyte additive as described above, in which the electrolyte additive accounts for 0.01 to 5 wt % based on the total weight of the non-aqueous electrolyte.

The lithium salt includes $LiPF_6$, $LiClO_4$, $LiBF_4$, $LiSO_3CF_3$, $LiN(SO_2CF_3)_2$, $LiN(SO_2CF_2CF_3)_2$, LiTFSI, $LiAsF_6$, $LiSbF_6$, $LiAlCl_4$, $LiGaCl_4$, $LiNO_3$, $LiC(SO_2CF_3)_3$, LiSCN, $LiO_3SCF_2CF_3$, $LiC_6F_5SO_3$, $LiO_2CCF_3$, $LiSO_3F$, $LiB(C_6H_5)_4$, $LiB(C_2O_4)_2$, or a combination thereof. The concentration of the lithium salt is 0.5 to 1.5 mol/L (M).

In an embodiment, the organic solvent includes ethylene carbonate (EC), propylene carbonate (PC), butylene carbonate, dipropyl carbonate, acid anhydrides, N-methylpyrrolidone, N-methyl acetamide, N-methyl formamide, dimethyl formamide, γ-butyrolactone, acetonitrile, dimethyl sulfoxide, dimethyl sulfite, 1,2-diethoxyethane, 1,2-dimethoxyethane, 1,2-dibutoxyethane, tetrahydrofuran, 2-methyl tetrahydrofuran, propylene oxide, sulfites, sulfates, phosphonates, or a derivative thereof.

In another embodiment, the organic solvent includes a carbonate, an ester, an ether, a ketone, or a combination thereof. The ester is selected from the group consisting of methyl acetate, ethyl acetate, methyl butyrate, ethyl butyrate, methyl propionate, ethyl propionate, and propyl acetate (PA). The carbonate includes EC, PC, diethyl carbonate (DEC), ethyl methyl carbonate (EMC), dimethyl carbonate (DMC), vinylene carbonate, butylene carbonate, dipropyl carbonate, or a combination thereof.

As the non-aqueous electrolyte of the disclosure has the meta-stable state nitrogen-containing polymer added as electrolyte additive, the non-aqueous electrolyte has an oxidation potential and a decomposition potential. In particular, the oxidation potential of the non-aqueous electrolyte of the disclosure is, for example, ranging from 4.5 V to 5 V, and at this time, the terminal reactive functional group of the meta-stable state nitrogen-containing polymer as the electrolyte additive reacts with a positive electrode material due to the applied voltage, and thus a protective film is formed on the positive electrode surface. Due to the protective film, the decomposition potential (also referred to as high-voltage resistant potential or oxidation resistant potential) of the non-aqueous electrolyte is increased to a range between 5 V and 6 V, preferably between 5.5 V and 6 V.

The method for preparing the non-aqueous electrolyte includes the following steps. Several organic solvents are mixed at a specific weight ratio, to form a mixture solution. Next, a lithium salt is added into the mixture solution at a specific concentration. Then, the electrolyte additive as described above is added, in which the electrolyte additive accounts for 0.01 to 5 wt % based on the total weight of the non-aqueous electrolyte.

Lithium Secondary Battery and Preparation Method Thereof

The lithium secondary battery includes a positive electrode, a negative electrode, a separator film, and a non-aqueous electrolyte. The preparation of the non-aqueous electrolyte is as described above, and will not be repeated herein.

A positive electrode slurry is formed by dissolving a positive electrode active substance, a conductive additive, and a binder in N-methyl-2-pyrollidone (NMP) respectively in the amounts of 80-95%, 3-15% and 3-10%. Next, the positive electrode slurry is uniformly coated on a 300 m-long, 35 cm-wide, and 20 μm-thick aluminium foil roll. After drying, the positive electrode roll is compacted by rolling and cut into strips, and finally dried under vacuum at 110° C. for 4 hours. The positive electrode active substance may be lithiated oxide, lithiated sulfide, lithiated selenide, and lithiated telluride of vanadium, titanium, chromium, copper, molybdenum, niobium, iron, nickel, cobalt and manganese, or a combination thereof. The conductive additive may be carbon black, graphite, acetylene black, nickel powder, aluminum powder, titanium powder and stainless steel powder, and a combination thereof. The binder may be a fluorine-containing resin binder, for example, polyvinylidene fluoride (PVDF), Teflon™ (polytetrafluoroethylene), styrene-butadiene rubber, polyamide resin, melamine resin, and carboxymethylcellulose (CMC) binder.

A negative electrode slurry is formed by dissolving a negative electrode active substance having a diameter of 1-30 μm and a binder in N-methyl-2-pyrollidone (NMP) respectively in the amounts of 90% and 3-10%. After stirring uniformly, the negative electrode slurry is coated on a 300 m-long, 35 cm-wide, and 10 μm-thick aluminium foil roll. The formed negative electrode roll is compacted by rolling and cut into strips, and similarly dried under vacuum drying at 110° C. for 4 hours. The negative electrode active substance may be mesophase carbon micro beads (MCMB), vapor grown carbon fiber (VGCF), carbon nano tubes (CNT), coke, carbon black, graphite, acetylene black, carbon fiber, glassy carbon, lithium alloy, or a combination thereof. The metal-based negative electrode may be made of Al, Zn, Bi, Cd, Sb, Si, Pb, Sn, $Li_3FeN_2$, $Li_{2.6}Co_{0.4}N$, $Li_{2.6}Cu_{0.4}N$, or a combination thereof. The negative plate may be further made of a metal oxide such as SnO, SnO$_2$, GeO, GeO$_2$, In$_2$O, In$_2$O$_3$, PbO, PbO$_2$, Pb$_2$O$_3$, Pb$_3$O$_4$, AgO, Ag$_2$O, Ag$_2$O$_3$, Sb$_2$O$_3$, Sb$_2$O$_4$, Sb$_2$O$_5$, SiO, ZnO, CoO, NiO, FeO, TiO$_2$, Li$_3$Ti$_5$O$_{12}$, or a combination thereof. The binder may be a fluorine-containing resin binder, for example, PVDF, Teflon™ (polytetrafluoroethylene), styrene-butadiene rubber, polyamide resin, melamine resin, and CMC binder.

The separator film is a polypropylene/polyethylene/propylene (PP/PE/PP) triple-layer film of 15-20 μm thick.

The method for preparing the lithium secondary battery includes winding the positive electrode, the negative electrode, and the separator film together, and compacting by rolling, and then placing into a rectangular housing of aluminium foil bag having a size of 38 mm×3.5 mm×62 mm, and finally, injecting the non-aqueous electrolyte as described above.

Hereinafter, multiple examples and comparative examples are described to verify the efficacy of the disclosure. The fabricated lithium half cell or lithium cell is subjected to the following tests: composition voltage test, capacitance-voltage test, charge and discharge cycle test, and thermal power test.

Decomposition Voltage Test

Linear sweep voltammetry (LSV) includes continuously testing a current passing through a battery or an electrode, and recording the variation of the potential over time. Herein, the decomposition voltage of the non-aqueous electrolyte is measured with an AUTOLAB at a scanning rate of 0.5 mv/s at a voltage between 3 V and 6 V.

Capacity-Voltage Test

Capacity-voltage (C-V) curve describes the relation between the voltage and the capacitance of the battery during charge and discharge. In the first to the fifth cycle, the battery is charged and discharged respectively at a rate of 0.1 C(C-rate, charge rate), 0.2 C, 0.5 C, 1 C, and 2 C, to measure the capacitance. In the test, charging with a constant current (CC) is performed first, and then charging with a constant voltage (CV) of 4.2 V is performed, and a cut-off current is one twentieth of the CC.

Charge and Discharge Cycle Test

In a cycling mode of charging at 0.2 C and discharging at 1 C, the variation of the capacitance of the battery after multiple charges and discharges is recorded.

Differential Scanning Calorimetry Test

The sample is taken from part of the positive electrode surface of the battery after being fully charged at 4.2 V and measured with a differential scanning calorimeter (DSC) for the peak temperature ($T_{peak}$) and the heat release ($\Delta H$).

Example 22

Figure 24:
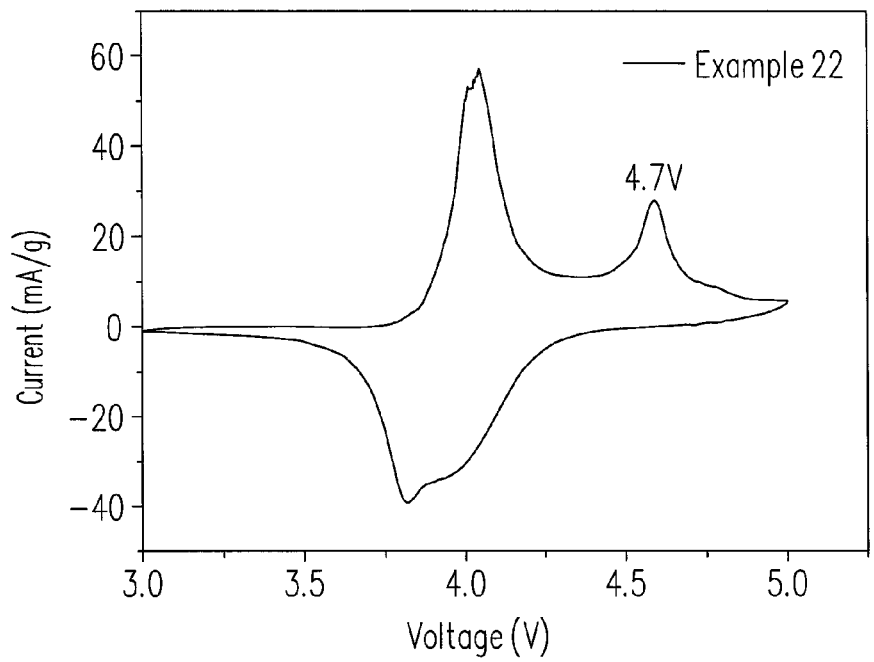
FIG. 24 shows a current-voltage curve when a voltage is applied on a positive electrode of a lithium half cell of Example 22 through cyclic voltammetry (CV).
Figure 24A:
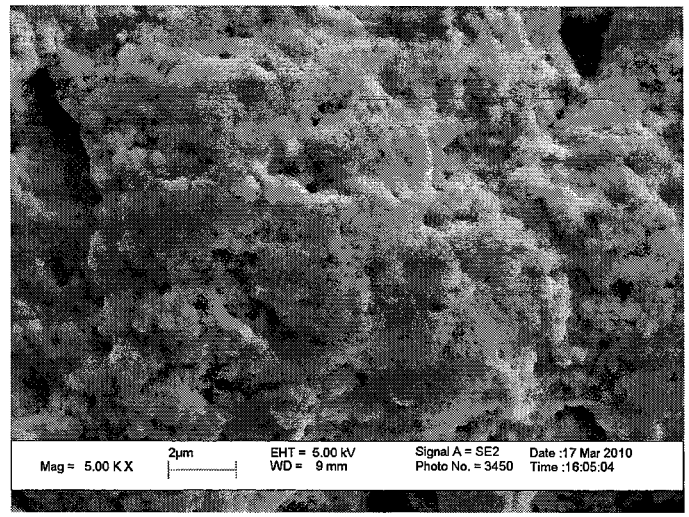
FIG. 24A is a scanning electron microscope (SEM) picture of a positive electrode of the lithium half cell of Example 22.

Two coin batteries (size CR2032) were assembled for cyclic voltammograms (CV) test. The positive electrode of the battery was made of LiCoO$_2$, the negative electrode was made of lithium metal, and the separator film was a PP/PE/PP triple-layer film. The electrolyte composition included LiPF$_6$ dissolved in a mixture solvent of PC, EC, and DEC (weight ratio EC/PC/DEC=3/2/5) in an amount of 1.1 M, and 1.5 wt % of the meta-stable state nitrogen-containing polymer of Example 1 as an electrolyte additive. The CV potential range was from 3 V to 5.2 V, the scanning rate was 0.1 mv/s, the reference electrode was lithium metal, and continuous three times of scanning were performed from 3 V to 5.2 V, and then from 5.2 V to 3 V. As shown in FIG. 24, an oxidation potential peak was present at 4.7 V for the first time. After disassembly, the surface topography of the positive electrode was observed under a scanning electron microscope (SEM). The positive electrode surface was found to be covered with a polymer layer, serving as a positive electrode protection layer, as shown in FIG. 24A.

Comparative Example 1

Figure 24B:
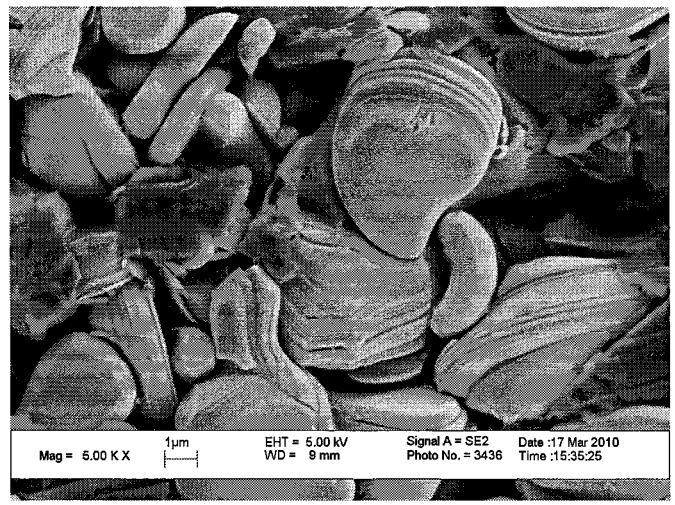
FIG. 24B is an SEM picture of a positive electrode of a lithium half cell of Comparative Example 1.

Two coin batteries (size CR2032) were assembled for CV test. The battery positive electrode was made of LiCoO$_2$, the negative electrode was made of lithium metal, and the separator film was PP/PE/PP triple-layer film. The electrolyte composition was LiPF$_6$ dissolved in a mixture solvent of PC, EC, and DEC (weight ratio EC/PC/DEC=3/2/5) in an amount of 1.1 M, without adding an electrolyte additive. No oxidation potential peak was found through CV potential scanning. After disassembly, the surface topography of the positive electrode was observed with SEM. As shown in FIG. 24B, the positive electrode surface was not covered with a polymer layer.

Example 23

Figure 25:
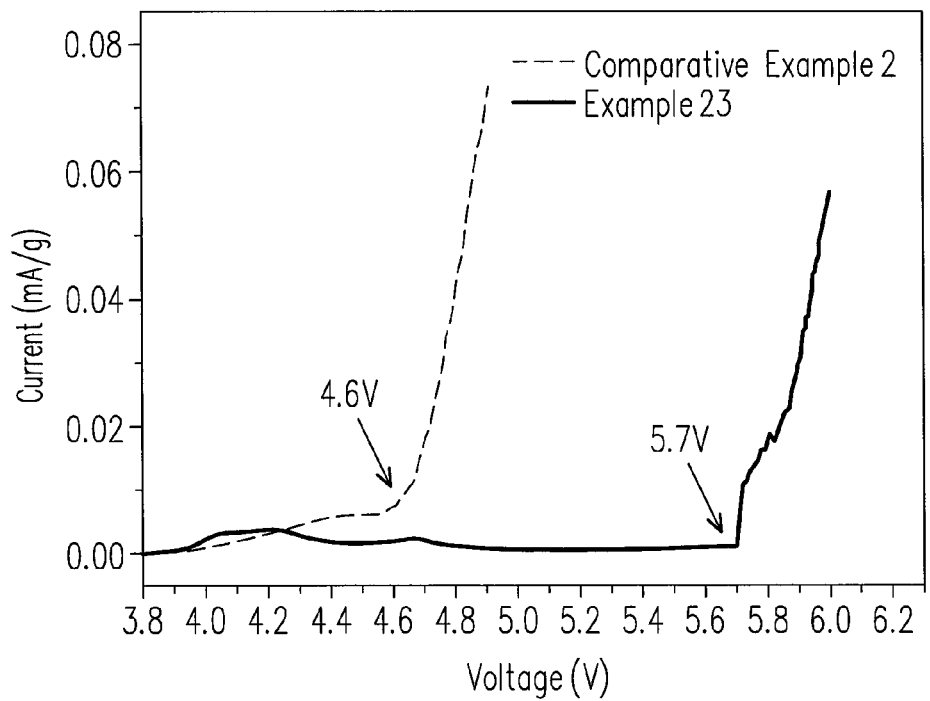
FIG. 25 is a graph of measurement results of linear sweep voltage (LSV) tests of lithium half cells of Example 23 and Comparative Example 2.

Two coin batteries (size CR2032) were assembled for linear sweep voltage (LSV) test. The battery positive electrode was made of LiCoO$_2$, the negative electrode was made of lithium metal, and the separator film was a PP/PE/PP triple-layer film. The electrolyte composition included LiPF$_6$ dissolved in a mixture solvent of PC, EC, and DEC (weight ratio EC/PC/DEC=3/2/5) in an amount of 1.1 M, and 1.5 wt % of the meta-stable state nitrogen-containing polymer of Example 1 as an electrolyte additive. The linear sweep potential range was from 3 V to 6 V, and the scanning rate was 0.5 mv/s. The decomposition potential of the electrolyte containing the additive of the disclosure was 5.7 V, as shown in FIG. 25.

Comparative Example 2

Two coin batteries (size CR2032) were assembled for LSV test. The battery positive electrode was made of LiCoO$_2$, the negative electrode was made of lithium metal, and the separator film was a PP/PE/PP triple-layer film. The electrolyte composition was LiPF$_6$ dissolved in a mixture solvent of PC, EC, and DEC (weight ratio EC/PC/DEC=3/2/5) in an amount of 1.1 M, without adding an electrolyte additive. The linear sweep potential range was from 3 V to 6 V, and the scanning rate was 0.5 mv/s. The decomposition potential of the electrolyte without an additive was 4.6 V, as shown in FIG. 25.

Example 24

Figure 26:
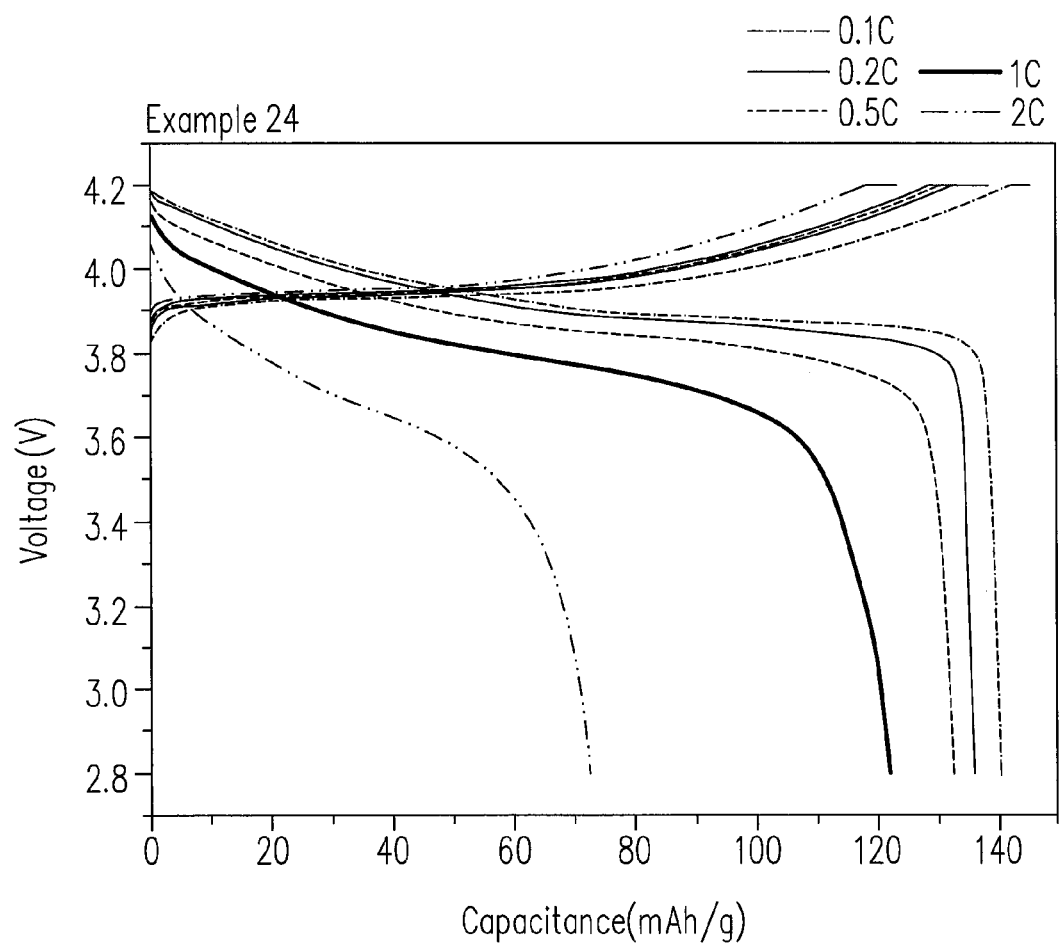
FIG. 26 shows a charge/discharge curve of a lithium half cell of Example 24.

Two coin batteries (size CR2032) were assembled for discharge capacitance tests at different charge and discharge rates, as shown in Table 4 and FIG. 26. The battery positive electrode was made of LiCoO$_2$, the negative electrode was made of lithium metal, and the separator film was a PP/PE/PP triple-layer film. The electrolyte composition included LiPF$_6$ dissolved in a mixture solvent of PC, EC, and DEC (weight ratio EC/PC/DEC=3/2/5) in an amount of 1.1 M, and 5 wt % of the meta-stable state nitrogen-containing polymer of Example 2 as an electrolyte additive.

Comparative Example 3

Figure 27:
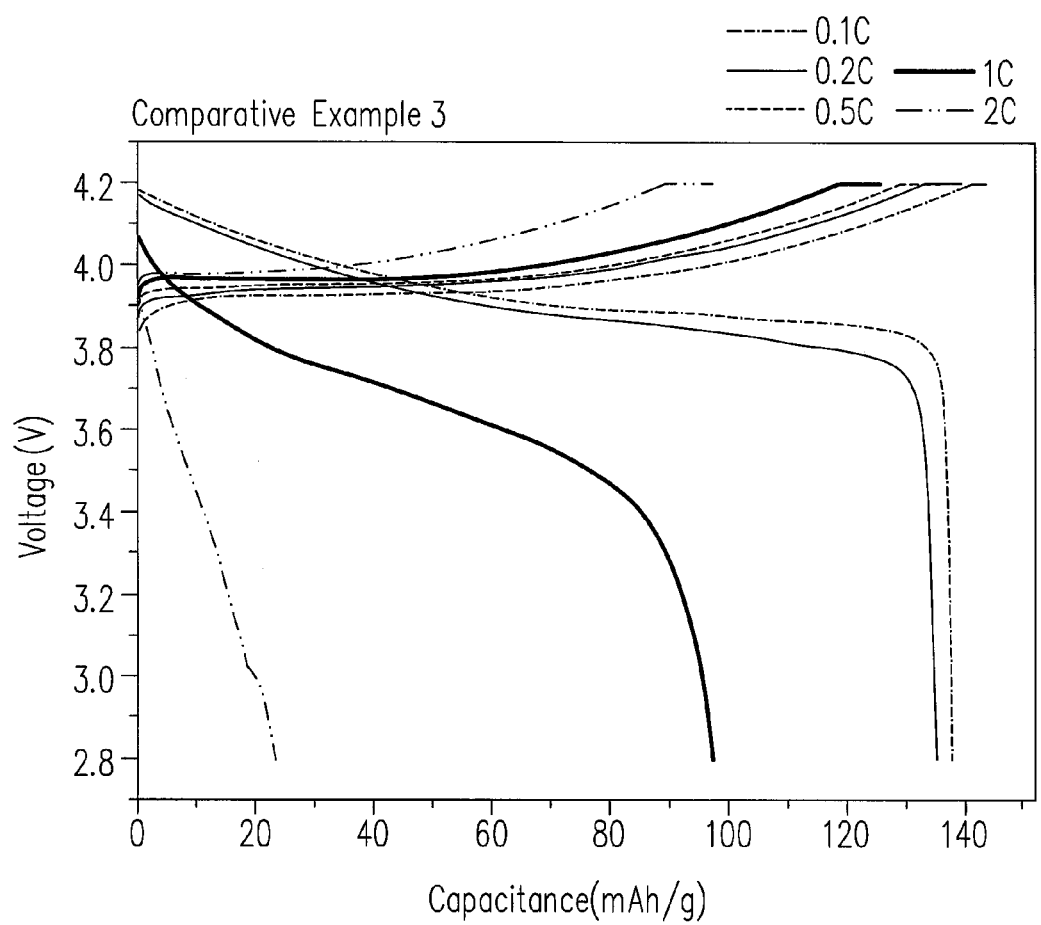
FIG. 27 shows a charge/discharge curve of a lithium half cell of Comparative Example 3.

Two coin batteries (size CR2032) were assembled for discharge capacity tests at different charge and discharge rates, as shown in Table 4 and FIG. 27. The battery positive electrode was made of LiCoO$_2$, the negative electrode was made of lithium metal, and the separator film was a PP/PE/PP triple-layer film. The electrolyte composition was LiPF$_6$ dissolved in a mixture solvent of PC, EC, and DEC (weight ratio EC/PC/DEC=3/2/5) in an amount of 1.1 M, without adding an electrolyte additive.

With charging at 0.2 C as 100% baseline, at the discharge rate of 1 C, the capacitance of Example 24 was maintained at 88%, while the capacitance of Comparative Example 3 was merely maintained at 70%.

TABLE 4

| | Charging at 0.2 C (mAh/g) | | Discharging at 0.2 C (mAh/g) | | Discharging at 0.5 C (mAh/g) | | Discharging at 1 C (mAh/g) | | Discharging at 2 C (mAh/g) | | Discharging at 0.2 C (mAh/g) | |
|---|---|---|---|---|---|---|---|---|---|---|---|---|
| | Capacity (mAh/g) | Percentage (%) | Capacity (mAh/g) | Percentage (%) | Capacity (mAh/g) | Percentage (%) | Capacity (mAh/g) | Percentage (%) | Capacity (mAh/g) | Percentage (%) | Capacity (mAh/g) | Percentage (%) |
| Example 24 | 138 | 100 | 136 | 98.6 | 132 | 95.7 | 122 | 88.4 | 73 | 53 | 136 | 98.6 |
| Comparative Example 3 | 137.5 | 100 | 134 | 97.5 | 123 | 89.5 | 96 | 70 | 23 | 16.7 | 130 | 94.5 |

Example 25

Figure 28:
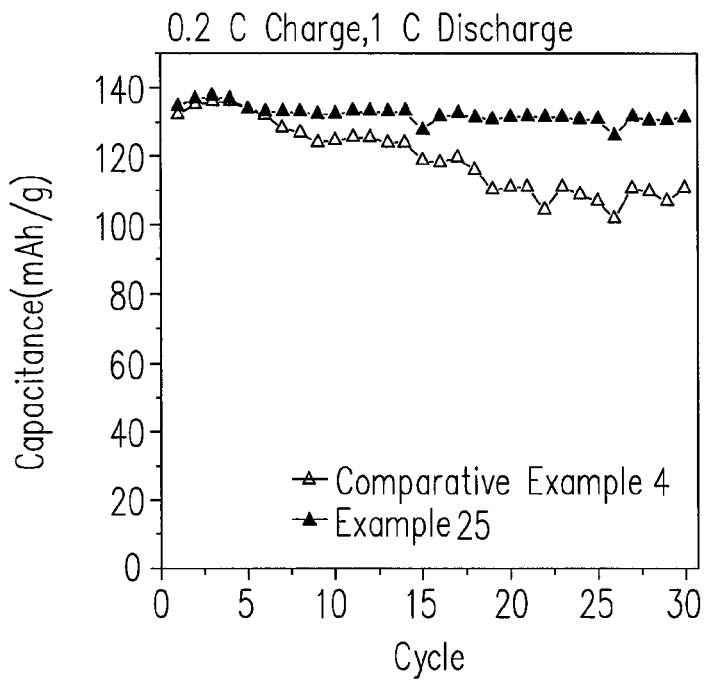
FIG. 28 is a graph of measurement results of charge and discharge cycle tests on lithium half cells of Example 25 and Comparative Example 4.

Two coin batteries (size CR2032) were assembled for capacity test of battery cycle life at room temperature (25° C.), as shown in FIG. 28. The battery positive electrode was made of LiCoO$_2$, the negative electrode was made of lithium metal, and the separator film was a PP/PE/PP triple-layer film. The electrolyte composition included LiPF$_6$ dissolved in a mixture solvent of PC, EC, and DEC (weight ratio EC/PC/DEC=3/2/5) in an amount of 1.1 M, and 3 wt % of the meta-stable state nitrogen-containing polymer of Example 1 as an electrolyte additive.

Comparative Example 4

Two coin batteries (size CR2032) were assembled for capacity test of battery cycle life at room temperature (25° C.), as shown in FIG. 28. The battery positive electrode was made of LiCoO$_2$, the negative electrode was made of lithium metal, and the separator film was a PP/PE/PP triple-layer film. The electrolyte composition was LiPF$_6$ dissolved in a mixture solvent of PC, EC, and DEC (weight ratio EC/PC/DEC=3/2/5) in an amount of 1.1 M, without adding an electrolyte additive.

After the 30$^{th}$ cycle life of the battery, the capacitance of Example 25 was maintained at 98%, while the capacitance of Comparative Example 4 was merely maintained at 84%.

Example 26

Figure 29:
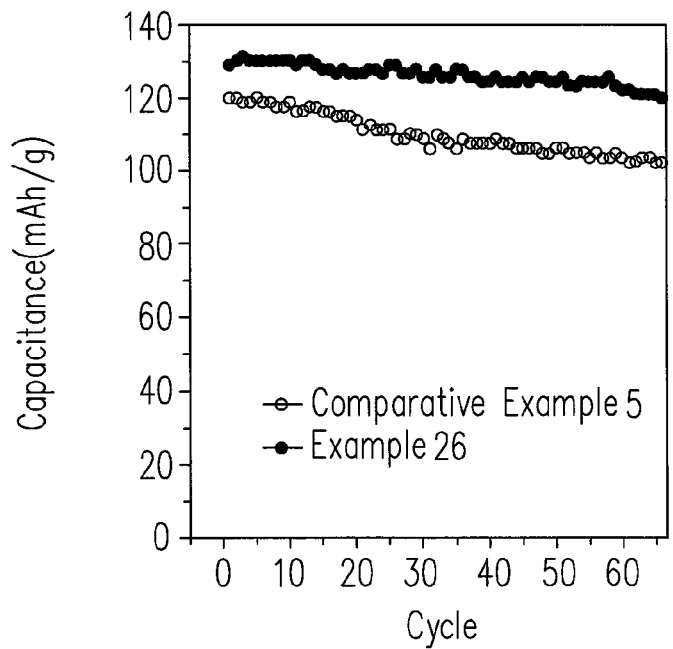
FIG. 29 is a graph of measurement results of charge and discharge cycle tests on lithium half cells of Example 26 and Comparative Example 5.

Two coin batteries (size CR2032) were assembled for capacity test of battery cycle life at room temperature (25° C.), as shown in FIG. 29. The battery positive electrode was made of LiNi$_{0.5}$Mn$_{1.5}$O$_4$, the negative electrode was made of lithium metal, and the separator film was a PP/PE/PP triple-layer film. The electrolyte composition included LiPF$_6$ dissolved in a mixture solvent of PC, EC, and DEC (weight ratio EC/PC/DEC=3/2/5) in an amount of 1.1 M, and 0.05 wt % of the meta-stable state nitrogen-containing polymer of Example 1 as an electrolyte additive.

Comparative Example 5

Two coin batteries (size CR2032) were assembled for capacity test of battery cycle life at room temperature (25° C.), as shown in FIG. 29. The battery positive electrode was made of LiNi$_{0.5}$Mn$_{1.5}$O$_4$, the negative electrode was made of lithium metal, and the separator film was a PP/PE/PP triple-layer film. The electrolyte composition was LiPF$_6$ dissolved in a mixture solvent of PC, EC, and DEC (weight ratio EC/PC/DEC=3/2/5) in an amount of 1.1 M, without adding an electrolyte additive.

The test conditions of LiNi$_{0.5}$Mn$_{1.5}$O$_4$ capacitance were as follows. After an activation procedure at 0.1 C, the battery was charged at a 0.2 C constant current to 4.9 V, and then discharged at 0.5 C to 3.5 V.

As shown in FIG. 29, the initial capacity (132 mAh/g) of Example 26 was 12 mAh/g higher than the initial capacity (120 mAh/g) of Comparative Example 5. Furthermore, after the 65$^{th}$ cycle life of the battery, the capacitance of Example 26 was still maintained at 91%, while the capacitance of Comparative Example 5 was merely maintained at 85%.

Example 27

Figure 30:
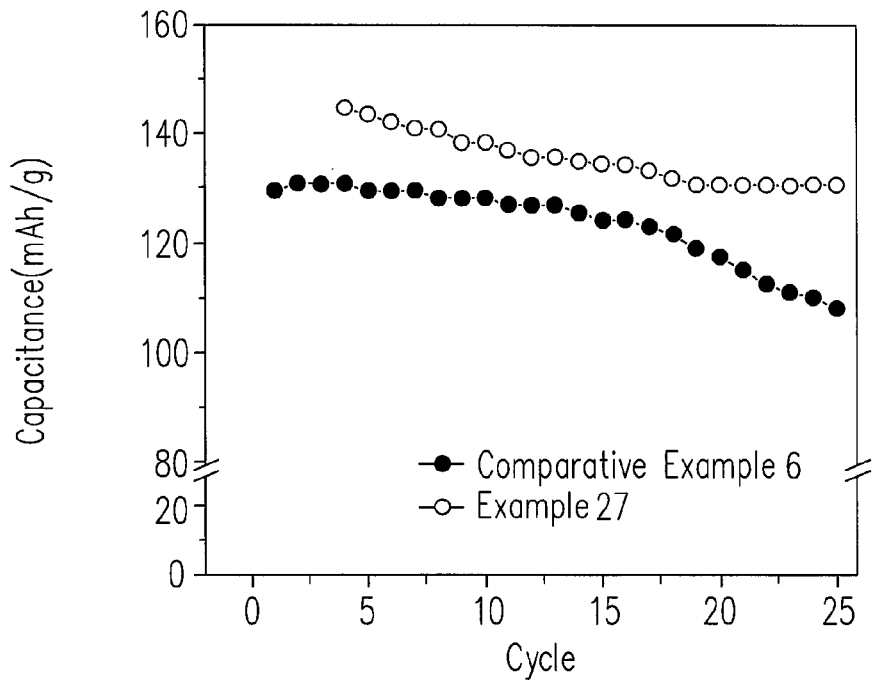
FIG. 30 is a graph of measurement results of charge and discharge cycle tests on lithium half cells of Example 27 and Comparative Example 6.

Two coin batteries (size CR2032) were assembled for capacity test of battery cycle life at 50° C., as shown in FIG. 30. The battery positive electrode was made of LiNi$_{0.5}$Mn$_{1.5}$O$_4$, the negative electrode was made of lithium metal, and the separator film was a PP/PE/PP triple-layer film. The electrolyte composition included LiPF$_6$ dissolved in a mixture solvent of PC, EC, and DEC (weight ratio EC/PC/DEC=3/2/5) in an amount of 1.1 M, and 1.5 wt % of the meta-stable state nitrogen-containing polymer of Example 7 as an electrolyte additive.

Comparative Example 6

Two coin batteries (size CR2032) were assembled for capacity test of battery cycle life at 50° C., as shown in FIG. 30. The battery positive electrode was made of LiNi$_{0.5}$Mn$_{1.5}$O$_4$, the negative electrode was made of lithium metal, and the separator film was a PP/PE/PP triple-layer film. The electrolyte composition was LiPF$_6$ dissolved in a mixture solvent of PC, EC, and DEC (weight ratio EC/PC/DEC=3/2/5) in an amount of 1.1 M, without adding an electrolyte additive.

As shown in FIG. 30, the initial capacity-(143 mAh/g) of Example 27 is 13 mAh/g higher than the initial capacitance (130 mAh/g) of Comparative Example 6. Furthermore, after the 25$^{th}$ cycle life of the battery, the capacity of Example 27 was still maintained at 91%, while the capacity of Comparative Example 6 was merely maintained at 82.5%.

Example 28

Figure 31:
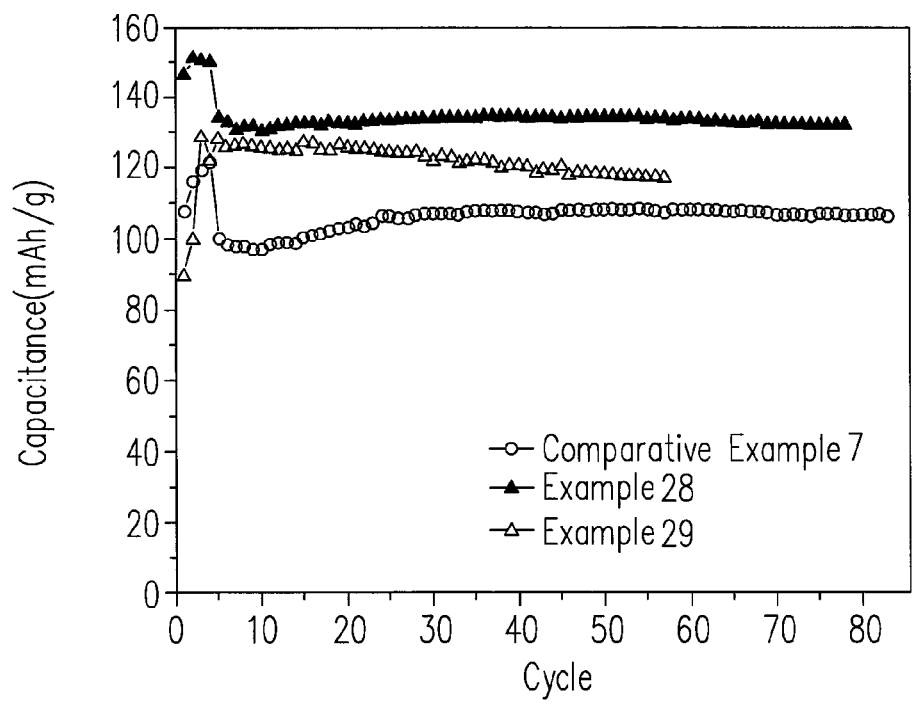
FIG. 31 is a graph of measurement results of charge and discharge cycle tests on lithium cells of Example 28, Example 29, and Comparative Example 7.

Two coin batteries (size CR2032) were assembled for capacity test of battery cycle life at room temperature (25° C.), as shown in FIG. 31. The battery positive electrode was made of $LiCoO_2$, the negative electrode was made of 90% of carbon powder having a diameter of 1-30 μm and 3-10% of PVDF binder, and the separator film was a PP/PE/PP triple-layer film. The electrolyte composition included $LiPF_6$ and LiTFSI dissolved in a mixture solvent of PC, EC, EMC, and DEC (weight ratio EC/PC/DEC/EMC=25/15/30/30) respectively in the amounts of 1.08 M and 0.12 M, and 2 wt % of the meta-stable state nitrogen-containing polymer of Example 8 as an electrolyte additive.

Example 29

Two coin batteries (size CR2032) were assembled for capacity test of battery cycle life at room temperature (25° C.), as shown in FIG. 31. The battery positive electrode was made of $LiCoO_2$, the negative electrode was made of 90% of carbon powder having a diameter of 1-30 μm and 3-10% of PVDF binder, and the separator film was a PP/PE/PP triple-layer film. The electrolyte composition included $LiPF_6$ dissolved in a mixture solvent of PC, EC, DEC, and EMC (weight ratio EC/PC/DEC/EMC=25/15/30/30) in an amount of 1.1 M, and 2 wt % of the meta-stable state nitrogen-containing polymer of Example 8 as an electrolyte additive.

Comparative Example 7

Two coin batteries (size CR2032) were assembled for capacity test of battery cycle life at room temperature (25° C.), as shown in FIG. 31. The battery positive electrode was made of $LiCoO_2$, the negative electrode was made of 90% of carbon powder having a diameter of 1-30 μm and 3-10% of PVDF binder, and the separator film was a PP/PE/PP triple-layer film. The electrolyte composition was $LiPF_6$ dissolved in a mixture solvent of EC, DEC, and EMC (weight ratio EC/DEC/EMC=40/30/30) in an amount of 1.1 M, without adding an electrolyte additive.

As shown in FIG. 31, the initial capacity (134 mAh/g) of Example 28 was 28 mAh/g higher than the initial capacity (106 mAh/g) of Comparative Example 7. Furthermore, after the 80$^{th}$ cycle life of the battery, the capacity of Example 28 was still maintained at 97%.

As shown in FIG. 31, the initial capacity (130 mAh/g) of Example 29 was 18 mAh/g higher than the initial capacity (106 mAh/g) of Comparative Example 7. Furthermore, after the 55$^{th}$ cycle life of the battery, the capacity of Example 29 was still maintained at 91%.

Example 30

Figure 32:
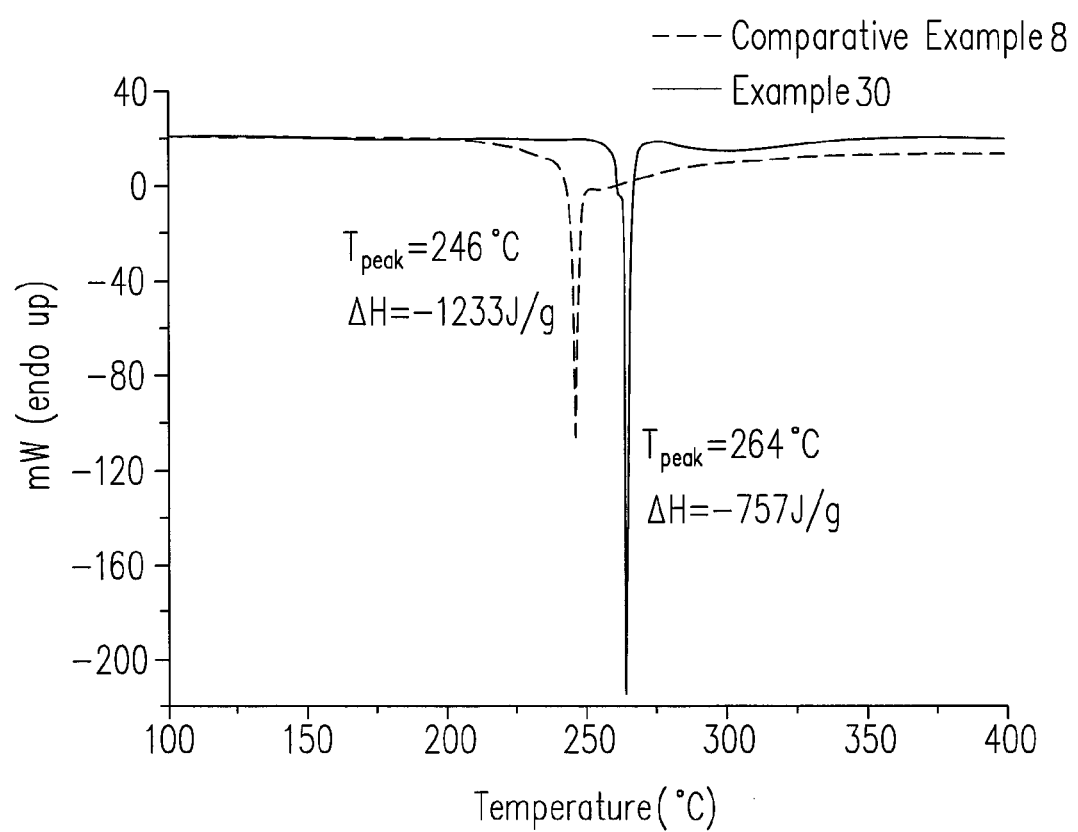
FIG. 32 is a graph of measurement results of lithium half cells of Example 30 and Comparative Example 8 through differential scanning calorimetry (DSC).

Two coin batteries (size CR2032) were assembled for heat release test on the battery positive electrode, as shown in FIG. 32. The battery positive electrode was made of $LiCoO_2$, the negative electrode was made of lithium metal, and the separator film was a PP/PE/PP triple-layer film. The electrolyte composition included $LiPF_6$ dissolved in a mixture solvent of PC, EC, and DEC (weight ratio EC/PC/DEC=3/2/5) in an amount of 1.1 M, and 1 wt % of the meta-stable state nitrogen-containing polymer of Example 1 as an electrolyte additive.

Comparative Example 8

Two coin batteries (size CR2032) were assembled for heat release test on the battery positive electrode, as shown in FIG. 32. The battery positive electrode was made of $LiCoO_2$, the negative electrode was made of lithium metal, and the separator film was a PP/PE/PP triple-layer film. The electrolyte composition was $LiPF_6$ dissolved in a mixture solvent of PC, EC, and DEC (weight ratio EC/PC/DEC=3/2/5) in an amount of 1.1 M, without adding electrolyte additive.

After being fully charged at 4.2 V, the batteries were disassembled in a glove box filled with Ar, and 7-10 mg of positive electrode plate containing the electrolyte was placed in a sampler tray for thermal analysis which was tolerant to a pressure of 150 bar, for DSC test.

As shown in FIG. 32, the peak temperature of the positive electrode surface sample of the battery of Example 30 was 264° C., and the heat released was 757 J/g, while the peak temperature of the positive electrode surface sample of the battery of Comparative Example 8 was 246° C., and the heat released was 1,233 J/g. Therefore, the addition of the electrolyte additive of the disclosure in the electrolyte can effectively postpone the reaction temperature of the electrolyte and the positive electrode by 18° C., and decrease the reaction heat by 38.6%.

Example 31

Figure 33:
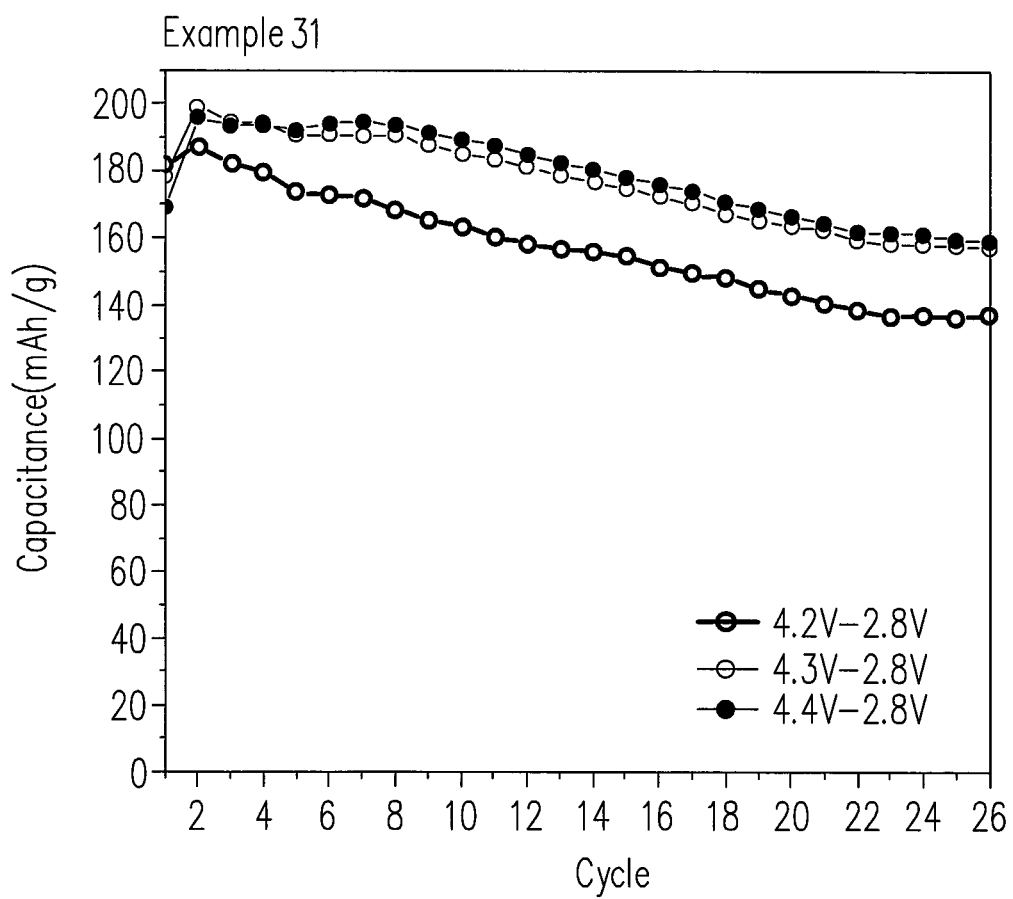
FIG. 33 is a graph of measurement results of a charge and discharge cycle test on a lithium cell of Example 31.

Three coin batteries (size CR2032) were assembled for capacity test of battery cycle life at room temperature (25° C.), as shown in FIG. 33. The battery positive electrode was made of $LiNi_4Mn_4CO_2O_2$, the negative electrode was made of MPGA, and the separator film was a PP/PE/PP triple-layer film. The electrolyte composition included $LiPF_6$ dissolved in a mixture solvent of PC, EC, DEC and EMC (weight ratio EC/PC/DEC/EMC=25/15/40/40) in an amount of 1.1 M, and 1.5 wt % of the meta-stable state nitrogen-containing polymer of Example 10 as an electrolyte additive.

The charge-discharge voltage ranges of the three coin batteries were respectively 4.2-2.8 V, 4.3V-2.8V and 4.4-2.8V. After the 26$^{th}$ cycle life of each battery, the capacitance of the battery with 4.2-2.8 V charge-discharge voltage range was maintained at 83%, and the capacitance of the battery with 4.3-2.8 V or 4.4-2.8 V charge-discharge voltage range was maintained at 86%. Further, the battery with 4.4-2.8 V charge-discharge voltage range had a higher capacities than the battery with 4.2-2.8 V charge-discharge voltage range by 26 mAh.

Example 32

Figure 34:
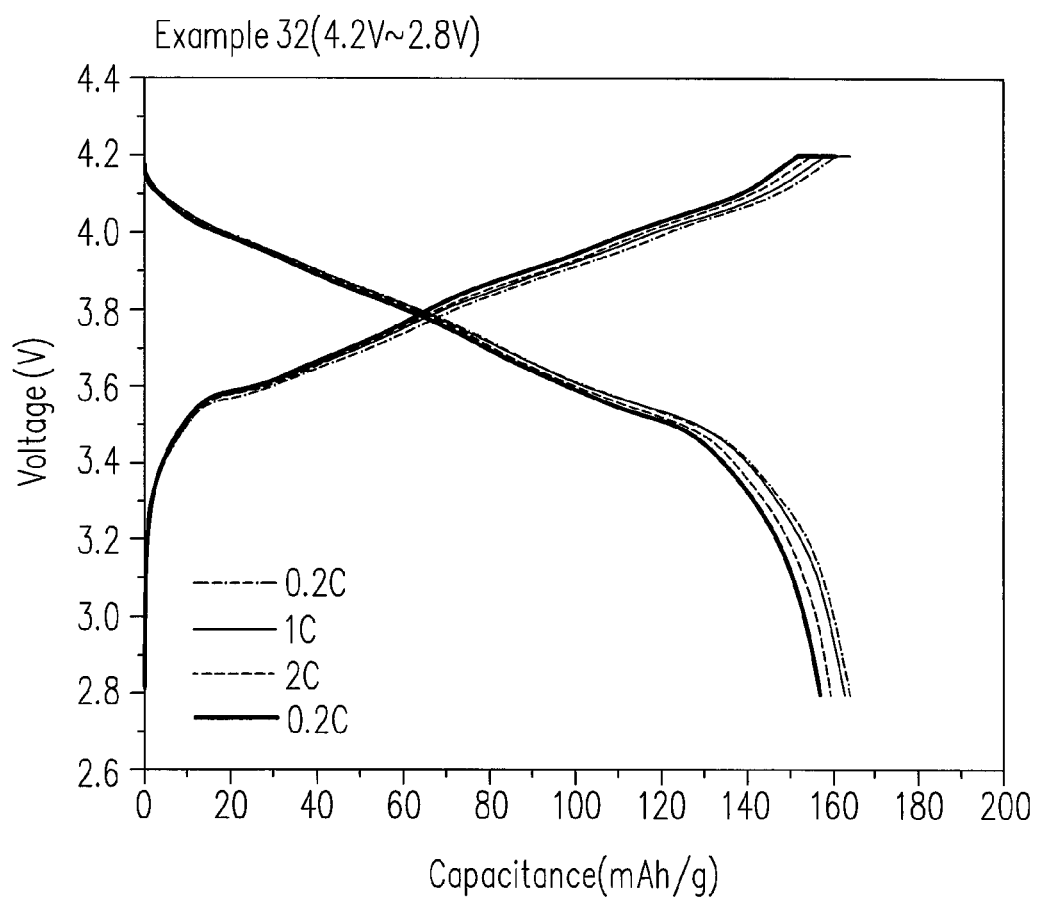
FIG. 34 shows a charge/discharge curve at 4.2-2.8V of a lithium cell of Example 32.
Figure 35:
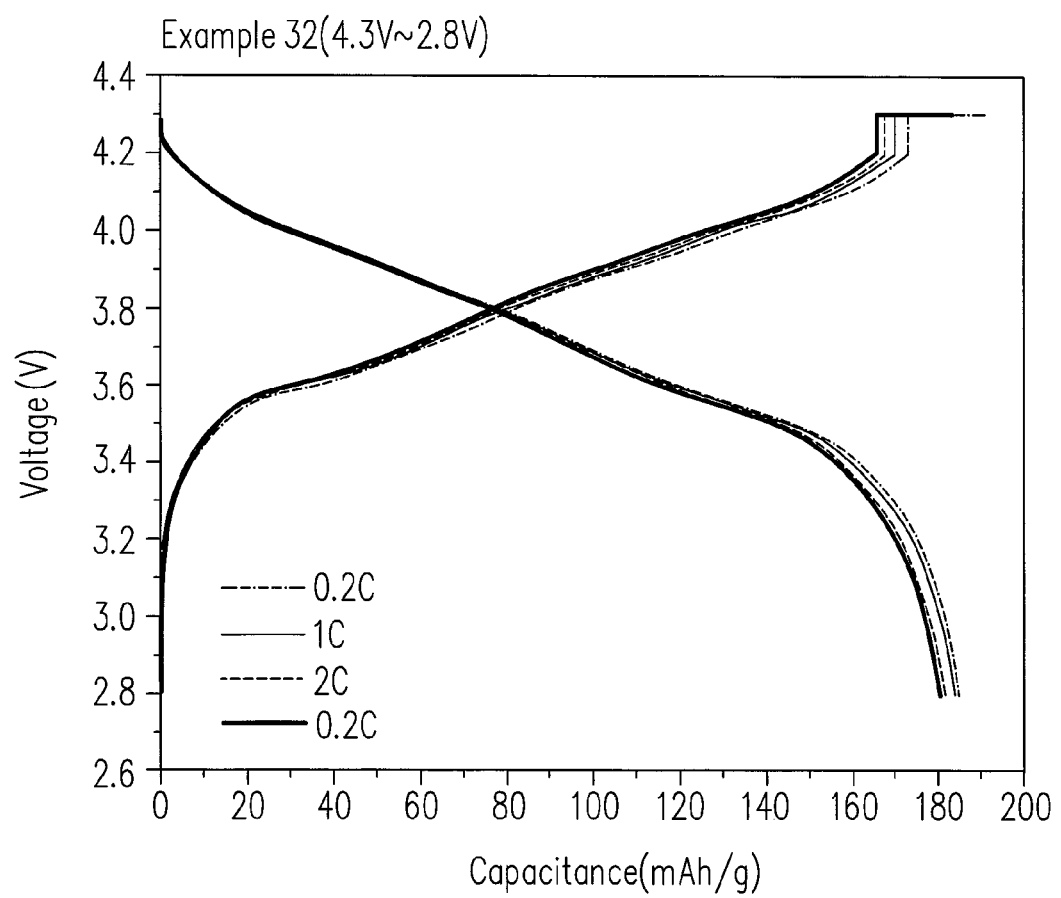
FIG. 35 shows a charge/discharge curve at 4.3-2.8V of a lithium cell of Example 32.
Figure 36:
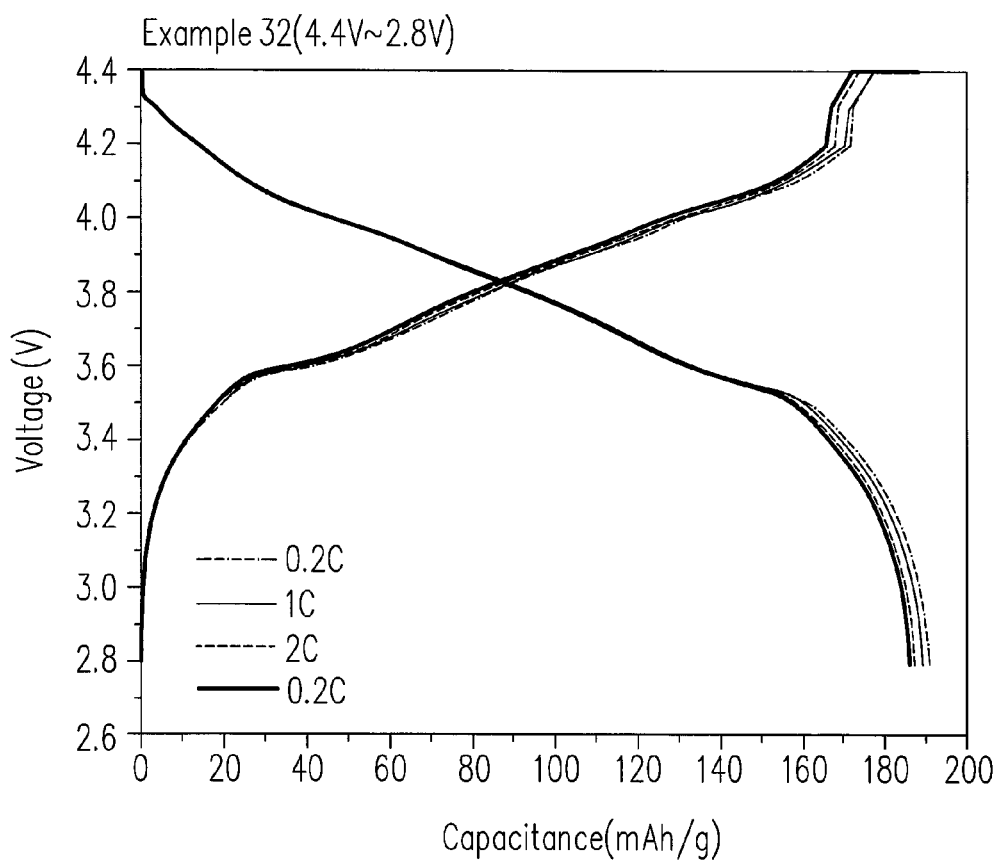
FIG. 36 shows a charge/discharge curve at 4.4-2.8V of a lithium cell of Example 32.

Three coin batteries (size CR2032) were assembled for discharge capacitance tests at different charge and discharge rates, as shown in Table 5 and FIGS. 34-36. The battery positive electrode was made of $LiNi_4Mn_4CO_2O_2$ the negative electrode was made of MPGA, and the separator film was a PP/PE/PP triple-layer film. The electrolyte composition included $LiPF_6$ dissolved in a mixture solvent of PC, EC, DEC and EMC (weight ratio EC/PC/DEC/EMC=25/15/40/40) in an amount of 1.1 M, and 1.5 wt % of the meta-stable state nitrogen-containing polymer of Example 11 as an electrolyte additive.

The charge-discharge voltage ranges of the three coin batteries were respectively 4.2-2.8 V, 4.3V-2.8V and 4.4-2.8V. With charging at 0.2 C as 100% baseline, the battery with 4.4-2.8 V charge-discharge voltage range, at different discharge rates, had a higher capacities than the battery with 4.2-2.8 V charge-discharge voltage range by 25 mAh or more.

TABLE 5

| Example 32 | Charging at 0.2 C (mAh/g) | | Discharging at 0.2 C (mAh/g) | | Discharging at 1 C (mAh/g) | | Discharging at 2 C (mAh/g) | | Discharging at 0.2 C (mAh/g) | |
|---|---|---|---|---|---|---|---|---|---|---|
| | Capacity (mAh/g) | Percentage (%) | Capacity (mAh/g) | Percentage (%) | Capacity (mAh/g) | Percentage (%) | Capacity (mAh/g) | Percentage (%) | Capacity (mAh/g) | Percentage (%) |
| 4.2-2.8 V | 168.3 | 100 | 164.1 | 97.5 | 162.8 | 96.7 | 159.7 | 94.9 | 157.2 | 93.4 |
| 4.3-2.8 V | 190.5 | 100 | 184.9 | 97.1 | 183.9 | 96.5 | 181.6 | 95.3 | 180.6 | 94.8 |
| 4.4-2.8 V | 193.7 | 100 | 193.7 | 98.1 | 188.4 | 97.3 | 186.6 | 96.3 | 185.6 | 95.8 |
| 4.2-2.8 V | 168.3 | 100 | 164.1 | 97.5 | 162.8 | 96.7 | 159.7 | 94.9 | 157.2 | 93.4 |

Example 33

Figure 37:
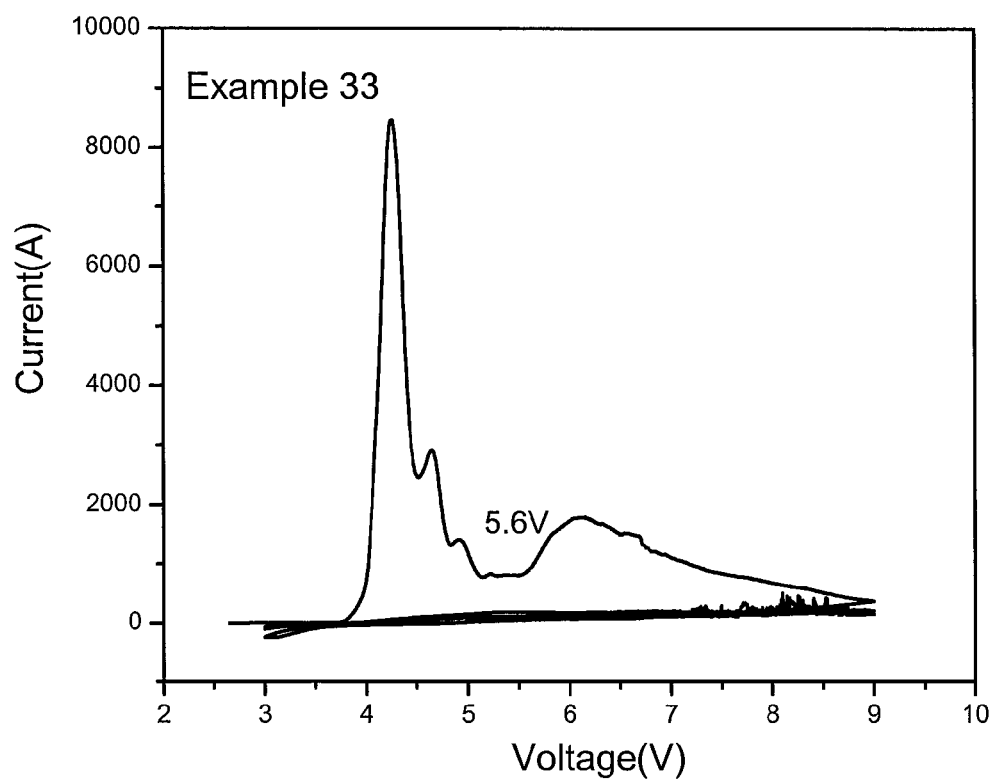
FIG. 37 is a graph of measurement results of a LSV test of a lithium half cell of Example 33.

One coin battery (size CR2032) was assembled for linear sweep voltage (LSV) test. The battery positive electrode was made of $LiNi_4Mn_4CO_2O_2$ the negative electrode was made of lithium metal, and the separator film was a PP/PE/PP triple-layer film. The electrolyte composition included $LiPF_6$ dissolved in a mixture solvent of EMC, EC, and DEC (weight ratio EC/EMC/DEC=4/3/3) in an amount of 1.1 M, and 1.5 wt % of the meta-stable state nitrogen-containing polymer of Example 21 as an electrolyte additive. The linear sweep potential range was from 3 V to 6 V, and the scanning rate was 0.5 mv/s. The decomposition potential of the electrolyte containing the additive of the disclosure was 5.6 V, as shown in FIG. 37.

In Examples 22-33 and Comparative Examples 1-8, merely part of the meta-stable state nitrogen-containing polymers formed in Examples 1-21 are used as the electrolyte additive for illustration; however, the disclosure is not limited thereto. Substantially, if the tests are repeated with the meta-stable state nitrogen-containing polymers of Examples 1-21, similar results will be obtained.

In view of the above, the non-aqueous electrolyte and the lithium secondary battery containing the non-aqueous electrolyte of the disclosure may improve the safety of the battery during overcharge or at high temperature caused by short-circuit current. The non-aqueous electrolyte of the disclosure contains the meta-stable state nitrogen-containing polymer as an electrolyte additive, such that the decomposition voltage of the electrolyte is up to 5.7 V, the reaction temperature of the electrolyte and the positive electrode is postponed by 15° C. or above, and the reaction heat is decreased by about 40%. Moreover, the high conductivity and low viscosity of the electrolyte at room temperature are maintained.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A non-aqueous electrolyte, comprising: a lithium salt; an organic solvent; and an electrolyte additive, comprising a reaction product of reactants of a Compound (A) and a Compound (B), wherein the Compound (A) is a monomer with a reactive terminal functional group, the Compound (B) is a heterocyclic amino aromatic derivative as an initiator, and a molar ratio of the Compound (A) to the Compound (B) is from 10:1 to 1:10, wherein the electrolyte additive is a meta-stable state nitrogen-containing polymer having a part of the reactive functional groups remained remaining, and wherein the electrolyte additive has a polydispersity index of 1.1-1.7;

wherein the Compound (A) comprises a maleimide, poly (ethylene glycol)dimethacrylate, bis[[4-[(vinyloxy)methyl]cyclohexyl]methyl]isophthalate), triallyl trimellitate, or a combination thereof, wherein the maleimide is represented by one of Formula (10) to Formula (13):

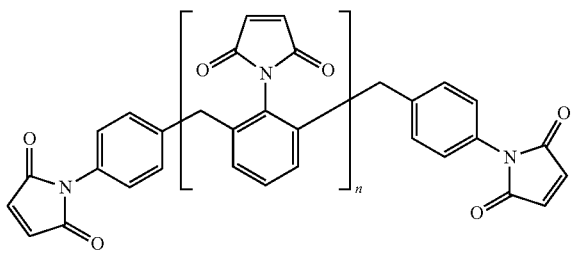

(10)

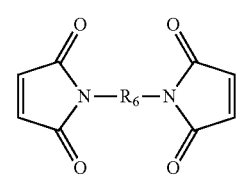

(11)

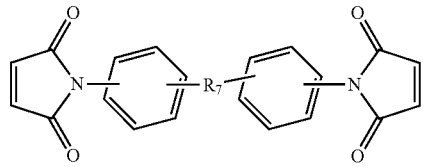

(12)

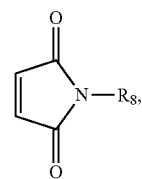

(13)

wherein n is an integer of 0 to 4; $R_6$ is —$RCH_2R'$—, —RNHR—, —C(O)$CH_2$—, —R'OR"OR'—, —$CH_2OCH_7$—, —C(O)—, —O—, —O—O—, —S—, —S—S—, —S(O)—, —$CH_2S(O)CH_2$—, —(O)S (O)—, —$C_6H_4$—, —$CH_2(C_6H_4)CH_2$—, —$CH_2(C_6H_4)$ (O)—, —CH$_2$—(NC$_2$H$_4$)—C$_2$H$_4$—, siloxane, biphenylenyl, substituted phenylene or substituted biphenylenyl, R is C$_{1-4}$ alkylene, R' is C$_{1-4}$ alkylene, biphenylenyl, substituted alkylene, substituted phenylene or substituted biphenylenyl, R" is C$_{1-4}$ alkylene, substituted alkylene, substituted phenylene or —C$_6$H$_4$—C(CF$_3$)$_2$—C$_6$H$_4$—, biphenylenyl or substituted biphenylenyl; R$_7$ is R$_i$CH$_2$—, —CH2-(O)—, —(CH$_3$)$_2$—, —O—, —O—O—, —S—, —S—S—, —(O)S(O)—, —C(CF3)2- or —S(O)—, R$_i$ is C$_{1-4}$ alkylene; and R$_8$ is hydrogen, C$_{1-4}$ alkyl, phenyl, benzyl, cyclohexyl, —SO$_3$H, —C$_6$H$_4$CN, N-methoxy carbonyl, —(C$_6$H$_4$)—O(C$_2$H$_4$O)—CH$_3$, —C$_2$H$_4$—(C$_2$H$_4$O)$_{11}$—OCH$_3$ or —C(O)CH$_3$.

2. The non-aqueous electrolyte according to claim 1, wherein the Compound (B) is represented by one of Formula (1) to Formula (9):

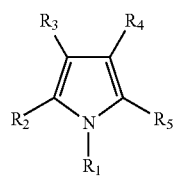
(1)

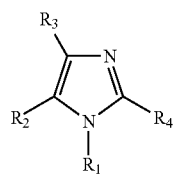
(2)

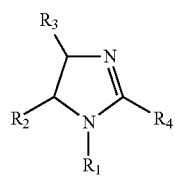
(3)

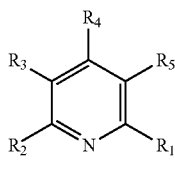
(4)

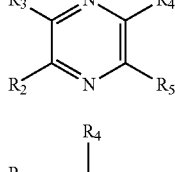
(5)

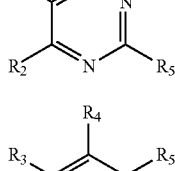
(6)

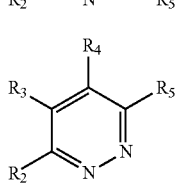
(7)

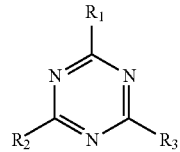
(8)

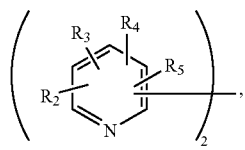
(9)

wherein R$_1$ is hydrogen, alkyl, alkenyl, phenyl, dimethylamino, or —NH$_2$; and R$_2$, R$_3$, R$_4$, and R$_5$ are each independently hydrogen, alkyl, alkenyl, halo, or —NH$_2$.

3. The non-aqueous electrolyte according to claim 1, wherein the Compound (B) comprises imidazole, an imidazole derivative, pyrrole, an pyrrole derivative, pyridine, 4-tert-butylpyridine, 3-butylpyridine, 4-dimethylaminopyridine, 2,4,6-triamino-1,3,5,-triazine, 2,4-dimethyl-2-imidazoline, pyridazine, pyrimidine, pyrazine, or a combination thereof.

4. The non-aqueous electrolyte according to claim 1, wherein the Compound (A) comprises 4,4'-diphenylmethane bismaleimide, oligomer of phenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 1,6'-bismaleimide-(2,2,4-trimethyl)hexane, 4,4'-diphenylether bismaleimide, 4,4'-diphenylsulfone bismaleimide, 1,3-bis(3-maleimidophenoxy)benzene, 1,3-bis(4-maleimidophenoxy)benzene, 2,2-bis(4-(p-maleimidophenoxy)-phenyl)-hexafluoropropane, 2,2-bis(p-maleimidophenyl)-hexafluoropropane, 1,8-bis-maleimidodiethylene glycol, tris(2-maleimidoethyl)amine, poly(ethylene glycol (11)) 4-maleimidophenyl methyl diether terminated, 4-maleimidophenol, 4-maleimido-benzenesufonic acid, poly(ethylene glycol(11)) 2-maleimidoethyl methyl diether terminated, 2-maleimido propylene glycol 1-(2-methoxyethyl) ether, ethylene glycol 2-maleimidopropyl methyl diether, or poly(dimethsiloxane)bis(3-maleimido-propyl-dimethyl silyl) terminated.

5. The non-aqueous electrolyte according to claim 1, wherein the molar ratio of the Compound (A) to the Compound (B) is from 1:1 to 5:1.

6. The non-aqueous electrolyte according to claim 1, wherein the electrolyte additive accounts for 0.01 wt % to 5 wt % based on a total weight of the non-aqueous electrolyte.

7. The non-aqueous electrolyte according to claim 1, wherein a decomposition voltage of the non-aqueous electrolyte is ranging from 5 V to 6 V.

8. The non-aqueous electrolyte according to claim 7, wherein the decomposition voltage of the non-aqueous electrolyte is ranging from 5.5 V to 6 V.

9. The non-aqueous electrolyte according to claim 1, wherein the electrolyte additive forms a protective film on a positive electrode surface at 4.5 V to 5 V.

10. The non-aqueous electrolyte according to claim 1, wherein the organic solvent comprises ethylene carbonate (EC), propenyl carbonate (PC), butylene carbonate, dipropyl carbonate, acid anhydrides, N-methyl pyrrolidone, N-methyl acetamide, N-methyl formamide, dimethyl formamide, γ-butyrolactone, acetonitrile, dimethyl sulfoxide, dimethyl sulfite, 1,2-diethoxyethane, 1,2-dimethoxyethane, 1,2-dibutoxyethane, tetrahydrofuran, 2-methyl tetrahydrofuran, propylene oxide, sulfites, sulfates, phosphonates, or a derivative thereof.

11. The non-aqueous electrolyte according to claim 1, wherein the organic solvent comprises a carbonate, an ester, an ether, a ketone, or a combination thereof.

12. The non-aqueous electrolyte according to claim 11, wherein the ester is selected from the group consisting of methyl acetate, ethyl acetate, methyl butyrate, ethyl butyrate, methyl propionate, ethyl propionate, and propyl acetate (PA).

13. The non-aqueous electrolyte according to claim 11, wherein the carbonate comprises ethylene carbonate (EC), propylene carbonate (PC), diethyl carbonate (DEC), ethyl methyl carbonate (EMC), dimethyl carbonate (DMC), vinylene carbonate, butylene carbonate, dipropyl carbonate, or a combination thereof.

14. The non-aqueous electrolyte according to claim 1, wherein the lithium salt comprises $LiPF_6$, $LiClO_4$, $LiBF_4$, $LiSO_3CF_3$, $LiN(SO_2CF_3)_2$, $LiN(SO_2CF_2CF_3)_2$, LiTFSI, $LiAsF_6$, $LiSbF_6$, $LiAlCl_4$, $LiGaCl_4$, $LiNO_3$, $LiC(SO_2CF_3)_3$, LiSCN, $LiO_3SCF_2CF_3$, $LiC_6F_5SO_3$, $LiO_2CCF_3$, $LiSO_3F$, $LiB(C_6H_5)_4$, and $LiB(C_2O_4)_2$, or a combination thereof.

15. The non-aqueous electrolyte according to claim 1, wherein a concentration of the lithium salt is from 0.5 to 1.5 mol/L (M).

16. A lithium secondary battery, comprising:
a positive electrode;
a negative electrode;
a separator film; and
a non-aqueous electrolyte, being the non-aqueous electrolyte according to claim 1.

17. The lithium secondary battery according to claim 16, wherein the negative electrode comprises a negative electrode active substance, and the negative electrode active substance is selected from the group consisting of mesophase carbon micro beads (MCMB), vapor grown carbon fiber (VGCF), carbon nano tubes (CNT), coke, carbon black, graphite, acetylene black, carbon fiber, glassy carbon, lithium alloy, and a combination thereof.

18. The lithium secondary battery according to claim 17, wherein the negative electrode further comprises a negative electrode binder, and the negative electrode binder comprises polyvinylidene fluoride (PVDF), polytetrafluoroethylene, styrene-butadiene rubber, polyamide resin, melamine resin, or carboxymethylcellulose (CMC) binder.

19. The lithium secondary battery according to according to claim 16, wherein the positive electrode comprises a positive electrode active substance, and the positive electrode active substance is selected from the group consisting of lithiated oxide, lithiated sulfide, lithiated selenide, and lithiated telluride of vanadium, titanium, chromium, copper, molybdenum, niobium, iron, nickel, cobalt and manganese, and a combination thereof.

20. The lithium secondary battery according to claim 19, wherein the positive electrode further comprises a positive electrode binder, and the positive electrode binder comprises polyvinylidene fluoride (PVDF), polytetrafluoroethylene, styrene-butadiene rubber, polyamide resin, melamine resin, or carboxymethylcellulose (CMC) binder.

21. The lithium secondary battery according to claim 19, wherein the positive electrode further comprises a conductive additive, and the conductive additive is selected from the group consisting of acetylene black, carbon black, graphite, nickel powder, aluminum powder, titanium powder, stainless steel powder, and a combination thereof.

\* \* \* \* \*